US010860955B2

(12) United States Patent
Ming et al.

(10) Patent No.: US 10,860,955 B2
(45) Date of Patent: Dec. 8, 2020

(54) JOB LOADER

(71) Applicant: Tower Rock Technologies, LLC, Bakersfield, CA (US)

(72) Inventors: Garrett Russell Ming, Bakersfield, CA (US); Thomas John Moser, Bakersfield, CA (US)

(73) Assignee: Tower Rock Technologies, LLC, Bakersfield, CA (US)

( * ) Notice: Subject to any disclaimer, the term of this patent is extended or adjusted under 35 U.S.C. 154(b) by 1024 days.

(21) Appl. No.: 14/245,682

(22) Filed: Apr. 4, 2014

(65) Prior Publication Data
US 2015/0286979 A1 Oct. 8, 2015

(51) Int. Cl.
*G06Q 10/06* (2012.01)
(52) U.S. Cl.
CPC ........... *G06Q 10/063112* (2013.01); *G06Q 10/06311* (2013.01)
(58) Field of Classification Search
None
See application file for complete search history.

(56) References Cited

U.S. PATENT DOCUMENTS

| | | | | |
|---|---|---|---|---|
| 6,101,480 A * | 8/2000 | Conmy | ................ | G06Q 10/109 705/7.18 |
| 6,263,322 B1 * | 7/2001 | Kirkevold | .......... | G06Q 30/0283 705/400 |
| 7,472,181 B2 * | 12/2008 | Hollinger | ............... | G06Q 10/02 379/201.12 |
| 7,502,747 B1 * | 3/2009 | Pardo | .................... | G06Q 10/06 705/7.13 |
| 2002/0007289 A1 * | 1/2002 | Malin | ................... | G06Q 10/06 705/4 |
| 2002/0072808 A1 * | 6/2002 | Li | .................... | G06Q 10/06398 700/5 |
| 2002/0181685 A1 * | 12/2002 | Doherty | ............. | H04L 41/0806 379/201.12 |

(Continued)

OTHER PUBLICATIONS

Thu, Pham Minh, Measuring the After Sale Service Quality and Examining its Effects on the Overall Customer Satisfaction at Honda Auto Dealers, 2014, Vietnam National University—Ho Chi Minh City (Year: 2014).*

*Primary Examiner* — Hafiz A Kassim
*Assistant Examiner* — Zahra Elkassabgi
(74) *Attorney, Agent, or Firm* — Newport IP, LLC; Jacob P. Rohwer

(57) ABSTRACT

The systems and/or processes described herein are configured to help an entity operating one or more facilities manage the scheduling and assignment of jobs. The systems and/or processes implement a loading service to manage the scheduling and assignment of jobs based on one or more factors including, but not limited to, a type of service or work to be performed on an item (e.g., an automobile), an initial estimated duration of time to perform the type of service or work, a revised estimated duration of time to perform the type of service or work (e.g., based on technician input), technician schedules, technician skills, technician skill level, and/or one or more labels assigned to a job. Consequently, the loading service is able to help, e.g., via the generation and output of graphical user interfaces, the entity balance the scheduling of appointments for jobs amongst technicians working at one or more facilities.

20 Claims, 25 Drawing Sheets

(56) References Cited

U.S. PATENT DOCUMENTS

| | | | | |
|---|---|---|---|---|
| 2004/0102983 | A1* | 5/2004 | Carlson | G06Q 10/04 |
| | | | | 705/7.19 |
| 2004/0199805 | A1* | 10/2004 | Yasunaga | G06Q 10/109 |
| | | | | 714/2 |
| 2005/0015294 | A1* | 1/2005 | Williams | G06Q 10/0639 |
| | | | | 705/7.29 |
| 2005/0228766 | A1* | 10/2005 | Roberts | G06Q 10/10 |
| 2006/0111957 | A1* | 5/2006 | Carmi | G06Q 10/063116 |
| | | | | 705/7.16 |
| 2007/0088701 | A1* | 4/2007 | Rao | G06Q 30/02 |
| 2009/0018859 | A1* | 1/2009 | Purifoy | G06Q 10/10 |
| | | | | 705/305 |
| 2009/0024423 | A1* | 1/2009 | Hay | G06Q 10/02 |
| | | | | 705/5 |
| 2009/0106036 | A1* | 4/2009 | Tamura | G06Q 10/109 |
| | | | | 705/305 |
| 2009/0252318 | A1* | 10/2009 | Smith | H04M 3/5238 |
| | | | | 379/265.1 |
| 2009/0307027 | A1* | 12/2009 | Charbeneau | G06Q 10/087 |
| | | | | 705/305 |
| 2013/0325541 | A1* | 12/2013 | Capriotti | G06Q 10/087 |
| | | | | 705/7.21 |

* cited by examiner

FIG. 13

New Appointment

Concerns

Primary Concern* — 1502
Electrical
Details: Electrical & Electronics

Primary Concern Description* — 1504

Additional Concerns and Requests — 1506

Options

Estimated Duration — 1508
1h

Preferred advisor
Any advisor

Preferred Date — 1512
Next Available

Schedule Appointment — 1510

| | |
|---|---|
| JIM G. | 2 HOURS 30 MINUTES |
| HAL W. | 3 HOURS 20 MINUTES |
| JESUS L. | 5 HOURS 15 MINUTES |
| PAM R. | 6 HOURS 45 MINUTES |
| REBECCA B. | 8 HOURS 0 MINUTES |
| JASON L. | 10 HOURS 0 MINUTES |

FIG. 23

JOB LOADER

BACKGROUND

Today, customers visit many different facilities (e.g., automobile service shops, hair salons, accounting firms, etc.) to service a variety of items belonging to the customers (e.g., repair a customer's automobile, style a customer's hair, prepare a client's tax return, etc.). Typically, these facilities individually comprise multiple work stations equipped to service the items. Each work station may comprise one or more technicians to perform the service on an item.

However, these facilities do not implement an effective way of scheduling service jobs for multiple technicians operating multiple work stations. Specifically, the facilities are unable to efficiently and accurately schedule service jobs across multiple technicians so that the scheduling is in balance. Moreover, the inefficient and inaccurate scheduling may cause a frustrating experience for a customer at least because the timing of the service of the customer's item may not meet the customer's expectations. For example, a customer may bring their item to the facility on a Tuesday for a scheduled appointment with an expectation that the item will be serviced that day (e.g., on Tuesday). However, due to a busy technician that is supposed to service the item, the facility may not be able to complete the service on Tuesday and may have to carry over the service to be completed on the next day, e.g., a Wednesday.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 13 illustrates an example graphical user interface directed to defining different job labels, as described herein in accordance with various embodiments.

FIG. 15 illustrates an example graphical user interface directed to determining a service or work type and an estimated duration of time to complete a new job, as described herein in accordance with various embodiments.

FIG. 16 illustrates an example graphical user interface directed to determining a period of time to schedule an appointment for a new job, as described herein in accordance with various embodiments.

FIG. 18 illustrates an example graphical user interface directed to receiving customer information and item information, as described herein in accordance with various embodiments.

FIG. 19 illustrates an example graphical user interface directed to displaying information associated with a scheduled job, as described herein in accordance with various embodiments.

FIG. 22 illustrates an example graphical user interface directed to defining types of work or service and an estimated duration of time to complete a job of a particular type, as described herein in accordance with various embodiments.

FIG. 23 illustrates an example graphical user interface directed to determining and displaying a total amount of technician time reserved for work appointments for a specified period of time, as described herein in accordance with various embodiments.

DETAILED DESCRIPTION

Figure 1:
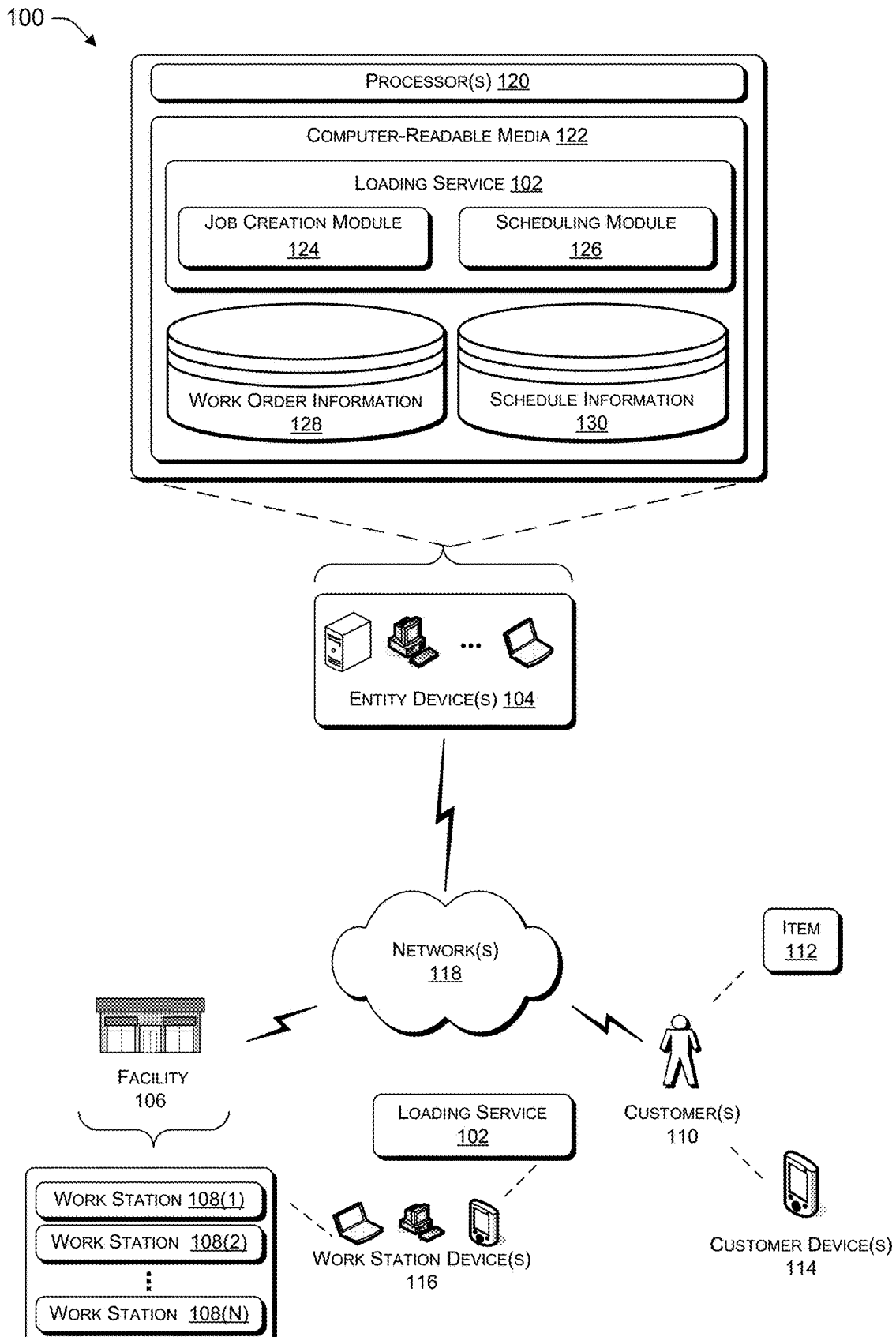
FIG. 1 is a diagram showing an example environment that implements a loading service to manage the scheduling of jobs at one or more facilities, as described herein in accordance with various embodiments.

The systems and/or processes described herein are configured to help an entity operating one or more facilities manage the scheduling and assignment of jobs. The systems and/or processes implement a loading service to manage the scheduling and assignment of jobs based on one or more factors including, but not limited to, a type of service or work to be performed on an item (e.g., an automobile), an initial estimated duration of time to perform the type of service or work, a revised estimated duration of time to perform the type of service or work (e.g., based on an advisor feedback), technician schedules, technician skills, technician skill level, and/or one or more labels assigned to a job. Consequently, the loading service is able to help, e.g., via the generation and output of graphical user interfaces, the entity balance the scheduling of appointments for jobs amongst technicians working at one or more facilities.

For instance, the loading service may be configured to load technicians, or aid in the loading of technicians, working at the one or more facilities such that efficient operation is achieved. Determining and outputting the load (e.g., a current load at a current time or future load at a future time) of a facility may provide visibility, e.g., to an observer (e.g., a scheduler, an advisor or a supervisor who manages the facility and schedules the jobs), to the distribution of jobs amongst the technicians operating work stations. As discussed herein, a "job" and an "appointment" may be associated such that the job may describe the type of service and/or work to be performed on an item and the appointment may represent a time slot, or an amount of time (e.g., reserved time), in a technician's schedule to perform for the job (e.g., work on the item).

The load of a facility becomes balanced, or closer to becoming balanced, when time differences in an amount of scheduled work from one technician to the next are minimized. For instance, when a first technician's schedule indicates ten hours of work scheduled for the current day (e.g., five service appointments each with two hours of time reserved), and a second technician's schedule indicates two hours of work scheduled for the current day (e.g., a single service appointment with two hours of time reserved), the load may indicate that there is an imbalance (e.g., the first technician is over-loaded or over-booked and the second-technician is under-loaded or under-booked). In contrast, when the first technician's schedule indicates six hours of work scheduled for the current day and the second technician's schedule indicates six hours of work scheduled for the current day (e.g., for the six two-hour service appointments mentioned above), the load may indicate that there is a balance.

Accordingly, the loading service discussed herein is configured to generate and output a facility schedule. The facility schedule may provide visibility and transparency to the load of one or more facilities (e.g., the distribution of jobs amongst technicians). The loading service generates the facility schedule by accessing individual schedules for multiple technicians. The multiple technicians may be workers (e.g., employees, contractors, etc.) of an individual facility or multiple facilities that may be operated by a same entity (e.g., Company ABC may operate multiple automobile dealership service departments). Thus, the facility schedule is comprised by accessing and aggregating scheduling information for multiple technicians (e.g., at least two technicians) such that an observer can see how the facility is loaded at a particular point in time or for a particular period of time (e.g., a snapshot view of the current facility load or a snapshot view of a future facility load at a user-specified date/time). Moreover, the observer may be able to compare one technician's schedule to other technicians' schedules to see if there is an imbalance in scheduled jobs (e.g., scheduled appointments). In some instances, the loading service may be configured to identify an imbalance in the load of the facility and provide a notification, e.g., to a representative that schedules jobs (e.g., an "advisor" in an automobile car dealership service department), of a technician that is over-booked and/or of a technician that is under-booked. Moreover, in some embodiments, the loading service may be configured to identify an imbalance in the load of the facility and automatically re-schedule a job (e.g., move a job from the over-booked technician's schedule to the under-booked technician's schedule).

In some implementations, the loading service may be configured to filter the facility schedule based on one or more of a type of service to be performed on an item, a technician or a group of technicians (e.g., a team), a representative that writes-up a work order and schedules the job, item information (e.g., a make and model of an automobile), a label assigned to a job, and so forth. The loading service may then cause a filtered schedule to be generated and output on a device so an observer (e.g., the representative, a technician, etc.) can conveniently view the schedule information based on a filtering instruction.

In further embodiments, the loading service may access the technicians' individual schedules and/or the facility schedule to determine available time slots for a new job to be performed on an item. For example, a representative may be in the process of receiving information from a customer and writing-up a work order so that a new job can be created and scheduled (e.g., a service appointment can be scheduled within a technician's schedule). During the process and before the job is assigned to a technician and time reserved in the technician's schedule, the loading service may identify available time slots and output the available time slots, e.g., via a graphical user interface. A time slot is a period of time within a technician schedule (e.g., fifteen minutes, thirty minutes, one hour, two hours, four hours, etc.). An available time slot may be a period of time that has not already been reserved for a job or for technician personal time, and thus, the available time slot is open for a job to be assigned and an appointment to be scheduled. The available time slots may be the next available time slots (e.g., the soonest available time to have an item serviced) or the available time slots may be determined in accordance with a specified period of time (e.g., available time slots for next Tuesday, a week from a current time, a time period when the customer wants to bring the item in to have it serviced, etc.). The loading service may determine the available time slots based on one or more of a type of service to be performed on an item, an estimated duration of time to perform the type of service, technician skills, technician skill level, one or more labels assigned to a job, and/or item information (e.g., size of an automobile). In some instances, the loading service may recommend or suggest one or more of the available time slots. In some implementations, the loading service may determine available time slots for jobs being re-scheduled (e.g., change an already scheduled appointment to a different time and/or a different technician).

In even further embodiments, the loading service may be configured to update individual technician schedules and/or the service facility schedule based on technician input (e.g., a technician schedule revision). For example, a technician may provide an indication that a job is taking, or will take, a longer amount of time than the initial duration of time reserved for the job, and the technician may revise his or her schedule accordingly. In another example, the technician may provide an indication that a job is taking, or will take, a shorter amount of time than the initial duration of time reserved for the job, and the technician may revise his or her schedule accordingly. In some instances, the loading service may be configured to generate a notification that informs the representative of a scheduling conflict that exists based on the indication from the technician and/or the technician schedule revision or that informs the representative of a new technician availability based on the indication from the technician and/or the technician schedule revision. Moreover, the loading service may be configured to automatically re-schedule a job in response to determining that a scheduling conflict exits or in response to determining a new technician availability.

Therefore, the loading service described herein helps an entity operating one or more facilities manage the scheduling and assignment of jobs by (i) generating and outputting graphical user interfaces directed to illustrating how one or more facilities, and individual technicians working at the facilities, are loaded (e.g., displaying technician schedules), (ii) determining and outputting available time slots for a new job or for a job to be re-scheduled, and/or (iii) implementing functionality that allows technicians to provide knowledgeable and real-time input regarding their schedules such that a facility schedule can be updated. As a result of the systems and techniques described herein, facilities may operate more efficiently and/or customers may be accurately informed, e.g., during the process of scheduling a job. For instance, a representative of the entity who is scheduling a job may inform a customer of (i) a likely time slot when the customer's item is scheduled to be serviced (e.g., an estimated start time of an appointment and an estimated complete time of an appointment), and (ii) the identification of a technician that will perform the service on the customer's item (e.g., name, skills, skill level, a profile photo, etc.).

As used herein, a job is associated with work to be performed on an item by a facility. As mentioned above, a technician may perform the job during time reserved in accordance with a scheduled appointment. In various embodiments discussed herein, a job may be a service job such that a technician is instructed to work on, or service, a customer's item. Conventional service facilities typically do not have an effective way of scheduling and assigning service jobs to technicians so that the shop load is balanced and the service facility operates in an efficient manner. Rather, conventional service facilities may implement a disorganized and uncoordinated dispatching approach where multiple representatives (e.g., advisors of an automobile dealership service department) at a service facility typically write-up service orders for service jobs and pass the service orders to a facility dispatcher. The facility dispatcher then manually dispatches the service jobs to technicians without being able to view any sort of technician schedules (e.g., the technician's daily schedules). For example, the facility dispatcher may hold a stack of service orders until individual technicians come to the facility dispatcher and indicate their availability to work on the next service job. Put another way, the facility dispatcher is unable to schedule or assign the service job to a specific time slot and/or a specific technician in advance (e.g., schedule an afternoon appointment for a service order written-up in the morning, schedule an appointment for Thursday for a service order written-up on the Monday of the same week, etc.). Moreover, the advisors that write-up the work orders are typically unaware of the technician who is servicing an item and a time when the item is to be serviced.

The loading service described herein provides visibility, e.g., via graphical user interfaces, to individual technician schedules and/or a facility schedule and makes the scheduling of jobs more efficient and/or coordinated (e.g., more balanced). Moreover, in various embodiments, the loading service may be configured to output scheduling suggestions and recommendations and/or automatically schedule an appointment based on various factors.

In various embodiments, the service facilities discussed herein may be automobile service shops (e.g., an automobile dealership operating a service department that performs a variety of different types of service jobs) and the serviceable item may be an automobile. While at least some of the examples used herein are described with respect to automobile service shops equipped with various work stations and technicians to perform a variety of different types of service jobs, it is understood that the system and/or processes described herein may be implemented in other service environments and service facilities equipped with work stations and technicians capable of servicing other items as well. For example, the loading service described herein may be implemented in other service facilities or service environments such as an engine repair shop (e.g., a serviceable item may be a boat, a jet ski, a motor cycle, a lawn mower, etc.), a large machinery repair shop (e.g., a serviceable item may be a semi-trailer truck or a tractor), a hair salon (e.g., a serviceable item may be a customer's hair), an accounting firm (e.g., a serviceable item may be a client's tax return), a beauty salon (e.g., a serviceable item may be customer's face where makeup is applied), a nail salon (e.g., the item is a customer's finger nails or toe nails that receive a manicure or pedicure), an equipment maintenance shop (e.g., the serviceable item may be a bicycle or a set of snow skis), a yard maintenance company that dispatches/schedules technician arrival at a customer's residence (e.g., the serviceable item may be a customer's yard), a roofing company that dispatches/schedules technician arrival at a customer's residence (e.g., the serviceable item may be a customer's house), etc. Thus, the serviceable item may be a detached item which the customer owns and/or possesses (e.g., an automobile, a bicycle, a house, a tax return prepared based on client information/statements, etc.). Or, the item may be part of, or attached to, the customer (e.g., hair, muscles, toe nails, etc.).

Additionally, the loading service described herein may also be implemented in work environments other than those that service a customer's item. For instance, the loading service may be implemented in a production facility where technicians manufacture or fabricate items. For example, the loading service may be configured to help schedule, e.g., across multiple technicians working in a lumber yard (e.g., lumber facility), the production of different types of lumber (e.g., length, size, type of wood, etc.). In another example, the loading service may be configured to help schedule, e.g., across multiple technicians working in a production center, the production of different types of apparatuses or gadgets. In productions facilities, the items produced may not yet belong to customers but may be fabricated or manufactured so that they can eventually be sold to customers. Accordingly, as discussed herein a job may be a production job to be scheduled within a production facility as well as a service job to be scheduled within a service facility.

FIG. 1 illustrates an example environment 100 that implements the system and/or processes described herein. The environment 100 includes a loading service 102 implemented on one or more entity device(s) 104. The loading service 102 is configured to generate a facility schedule for one or more facilities 106 operating one or more work stations 108(1) . . . 108(N). The loading service 102 may generate the facility schedule after accessing and aggregating individual technician schedules. The loading service 102 may use the technician schedules and/or the facility schedule to determine one or more time slots available to schedule or re-schedule a job (e.g., to service an item for a customer).

Accordingly, when output or displayed, the facility schedule allows a scheduling representative of the facility 106 that writes-up work orders and schedules appointments for the jobs (e.g., an advisor, a manager, a supervisor, a secretary, etc.) to conveniently view how the facility is loaded for a given period of time (e.g., an afternoon snap shot of the facility, a snap shot of the facility for tomorrow or a day next week). Moreover, technicians may be able to view their own schedules for a given period of time and provide input regarding schedules. The loading service 102 may then update the technician schedules and/or the facility schedule based on the technician input.

As discussed herein, an entity operating the entity device(s) 104, and/or implementing the loading service 102, may be a company, a corporation, an enterprise, a government agency, an educational department, a non-profit organization or any other establishment configured to offer services to customers. Therefore, the environment 100 shows customer(s) 110, where each customer 110 may be associated with a serviceable item 112. In some implementations, a customer 110 may also be associated with a customer device 114 that is usable to request the scheduling of a job (e.g., an online reservation, a telephone call). Accordingly, in some instances, the customer 110 may access the functionality of the loading service 102 to create a job and have an appointment scheduled in an available time slot independent of interacting with a scheduling representative of the entity.

As discussed above, the one or more facilities 106 may include one or more work stations 108(1) . . . 108(N), wherein N is a whole number such as one, two, three, four, five, eight, ten, twenty, etc. As further discussed herein, a technician may be assigned to an individual work station, e.g., 108(1), to perform a job on an item 112 of the customer 110. A technician, in the context of this document, may comprise an individual technician or multiple technicians (e.g., two or more technicians) that control an individual work station, e.g., 108(1). For example, the job may be a job capable of being performed by one person. Or, the job may be a job that, for any one of a variety reasons, the entity would like more than one technician to perform (e.g., the job requires multiple people, efficiency is improved if multiple people perform the job, etc.). Accordingly, a technician may include, but is not limited to, a mechanic, a repair man or woman, a hair stylist, an accountant, a make-up artist, an equipment tuner (e.g., skis, bicycles, etc.), a furniture builder and so forth. In some instances, a work station may also be referred to as a stall, a team (e.g., a yard service team, a roofing team, etc.) or any other identifier or reference that can separate one work unit operated by an entity from the next (e.g., work station 108(1) from work station 108(2)).

In various implementations discussed herein, the work associated with a job is performed by one or more humans (e.g., a technician). In alternative implementations, the work may be performed by one or more machines (e.g., mechanical equipment, robots, etc.). In some instances, the work may be performed by both humans and machines (e.g., humans that instruct or operate the machines).

Work stations 108(1) . . . 108(N) may be assigned one or more work station devices 116 configured to communicate information to the entity device(s) 104. For instance, a technician may view his or her own schedule of appointments associated with assigned jobs for a given time period (e.g., the current day) and provide input regarding the scheduling. In one example, the technician may input and communicate that a job is taking, or likely will take, more time than what was initially reserved (e.g., by a scheduling representative). In another example, the technician may input and communicate that a job took, or will take, less time than what was initially reserved. In yet another example, the technician may input and communicate a revised estimated duration of time for an appointment on the technician schedule (e.g., based on a technician analysis of work to be performed on an item). These different types of example technician input may affect the technician's schedule and/or the facility schedule. Thus, the loading service 102 may be configured to provide notifications and/or scheduling recommendations such that a scheduling representative may review and update the technician's schedule and/or the facility schedule. In various implementations, the loading service 102 may be configured to automatically make a change to the technician's schedule and/or the facility schedule (e.g., re-schedule an already scheduled appointment).

In various embodiments, a work station device 116 may be assigned to each of the work stations 108(1) . . . 108(N). In other embodiments, multiple work stations 108(1) . . . 108(N) may share a work station device 116. In some implementations, the technicians may communicate a scheduling update to the entity device(s) 104 independent of using a work station device 116, such as by physically walking from a first location of the work station 108(1) to a second location of the entity device 104 to verbally communicate the scheduling update. A representative of the facility 106 other than the technicians may then enter information associated with the technician scheduling update at an entity device 104.

Each of the devices (e.g., an entity device 104, a customer device 114, a work station device 116) in the environment 100 of FIG. 1 may be any one of a variety of devices including, for example, a desktop computer, a laptop computer, a tablet computer, a netbook computer, a smart phone, a portable digital assistant (PDA), a web-enabled mobile phone, a cellular phone, a gaming console, a set-top box, a multifunction communication device, a server, or any other electronic device capable of generating and updating schedule information.

In various embodiments, the communication between the entity device(s) 104, the customer device(s) 114 and/or the work stations device(s) 116 may comprise network communications. Thus, the environment in FIG. 1 illustrates that the entity device(s) 104, the customer device(s) 114 and/or the work stations device(s) 116 may be connected by one or more network(s) 118. The one or more network(s) 118 may include, but are not limited to, one or a combination of a Local-Area Network (LAN), a Wide-Area Network (WAN), a Mobile Telephone Network MTN, bluetooth communications, radio frequency communications, or other communication technologies (e.g., wireless and/or wired). The one or more network(s) 118 may conduct communications while the devices (e.g., an entity device 104, a customer device 114 and/or a work stations device 116) are located at, or within, an individual facility 106. Alternatively, the one or more network(s) 118 may conduct communications while one or more of the devices are at a location separate from a location of the facility 106. For example, a work station device 116 may be controlled by a team of roofers located at a customer's residence and an entity device 104 may be located at the facility 106 or at corporate headquarters. In another example, a customer 110 may leave the facility 106 to run errands after dropping off an item 112 for service and the customer 110 may want to receive timing updates or notifications via a customer device 114 while running the errands.

Accordingly, the loading service 102 is configured to maintain individual technician schedules, generate a facility schedule based on accessing and aggregating the technician schedules, update the technician schedules and/or the facility schedule based on technician input, and/or determine one or more available time slots for a new job to be scheduled or an already scheduled job to be re-scheduled.

The environment 100 of FIG. 1 shows that an entity device 104 operating the loading service 102 may include one or more processors 120 and computer-readable media 122. The computer-readable media 122 may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, redundant array of independent disks ("RAID") storage systems, or any other medium which can be used to store the desired information and which can be accessed by devices. The computer-readable media 122 may be implemented as computer-readable storage media ("CRSM"), which may be any available physical and non-transitory media accessible by the processor(s) 120 to execute instructions stored on the memory. In one implementation, CRSM may include RAM and Flash memory. In other implementations, CRSM may include, but is not limited to, ROM, EEPROM, or any other tangible medium which can be used to store the desired information and which can be accessed by the processor(s) 120.

The computer readable-media 122 may comprise the loading service 102. In various embodiments, the loading service comprises a job creation module 124 and a scheduling module 126, each of which is further discussed herein. The computer-readable media 122 may also comprise a work order information database 128 and a schedule information database 130. It is understood, in the context of this document, that one or more components (e.g., a module or a database) associated with the loading service 102 may also be implemented on a work station device 116 as well as an entity device 104. Thus, a work station device 116 may also include processor(s) and computer readable-media based on the description above. In some embodiments, the loading service 102 may be implemented as software as a service (SaaS) by the entity operating the facility 106 or another entity (e.g., a third-party entity) that has a commercial or business relationship with the entity operating the facility 106.

As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules may be implemented as part of an operating system. In other instances, the functions and/or modules are implemented as part of a device driver, firmware, and so on.

In various embodiments, the job creation module 124 is configured to create work orders for jobs and store the work orders in the work order information database 128. For example, the job creation module 124 may be configured to generate, communicate and/or output graphical user interfaces directed to requesting and receiving input associated with a job. The input may be used to generate and to process a work order so the job can be assigned to a technician and scheduled within the technician's schedule. The input may include item information and/or customer information, as further described herein. In various embodiments, the input may be provided by a scheduling representative via an entity device 104 (e.g., an advisor, a supervisor, a manager, a receptionist, etc.). In alternative embodiments, the input may be provided by a customer 110 via a customer device 114.

In various embodiments, the scheduling module 126 is configured to generate and maintain scheduling information, e.g., store the scheduling information in the schedule information database 130. The scheduling information may comprise individual technician schedules and the facility schedule as discussed above. Thus, the scheduling module 126 may be configured to access individual technician schedules and generate the facility schedule based on the individual technician schedules. The scheduling module 126 may further be configured to update the schedule information stored in the schedule information database 130 based on input received from technicians. Moreover, the scheduling module 126 is configured to use the scheduling information to schedule or re-schedule appointments. For example, the scheduling module 126 may identify one or more available time slots for a new job and the scheduling module 126 may output the available time slots as a suggestion or recommendation to be considered, e.g., by the scheduling representative. The scheduling module 126 may also be configured to determine, based on information associated with a job, one or more already scheduled jobs as candidate jobs to be re-scheduled and the scheduling module 126 may output the candidate jobs as a suggestion or recommendation to be considered. The scheduling module 126 may be configured to generate, communicate and/or output graphical user interfaces that visually distinguish the suggestions and/or recommendations. The graphical user interfaces may be directed to first notifying a scheduling representative and then requesting and receiving input associated with scheduling or re-scheduling a service appointment for a service job (e.g., reserving time in a technician schedule).

In some instances, the scheduling module 126 may be configured to automatically schedule or re-schedule a job based on an analysis of one or more factors associated with a job.

The job creation module 124 and/or the scheduling module 126 may be configured to cause graphical user interfaces to be output via one or more of an entity device 104, a customer device 114 and/or a work station device 116. For example, the graphical user interfaces may be displayed, e.g., via a display screen, a monitor, a touch screen, etc., at the aforementioned devices. In another example, information associated with the content of the graphical user interfaces may be communicated from one device to another device so that the graphical user interfaces can be displayed on the other device.

In some embodiments, the loading service 102 discussed herein may be implemented in accordance with remote servicing of an item (e.g., the customer may not have to physically bring the item to a physical facility to have it worked on). For example, a technician may be operating a work station at a first location (e.g., a desk or cubicle located at a corporate office) and a customer and the customer's item may be at a second location while being worked on (e.g., the customer's home address). The technician may communicate with the customer over a network connection or a phone line to service the customer's item. For instance, the item may be a home computing device and the service job may be associated with fixing the computing device or installing/updating software on the computing device. Therefore, an entity that remotely services items may also implement the loading service described herein.

Figure 2:
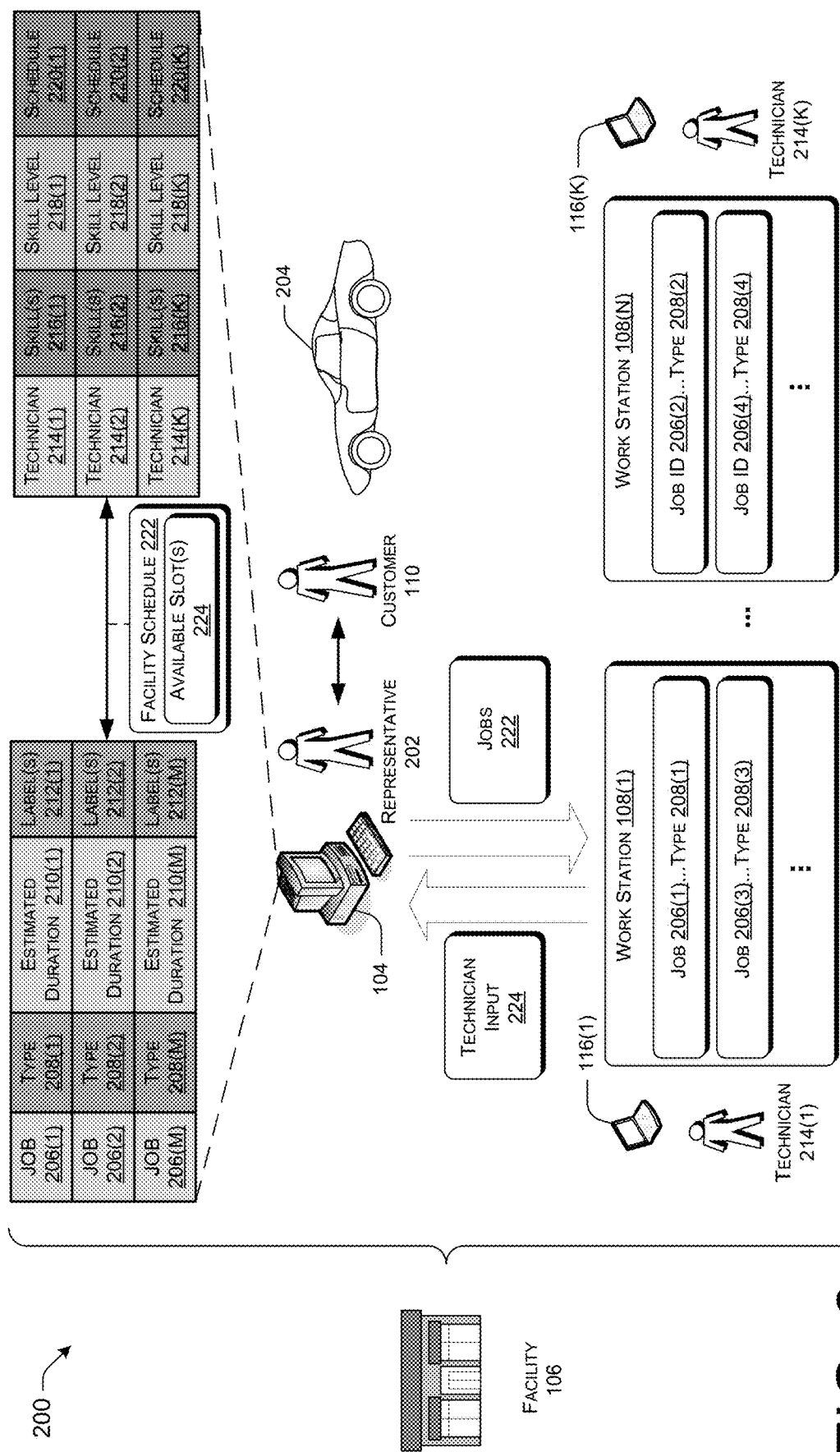
FIG. 2 is a diagram showing one or more facilities that schedule appointments for technicians to perform jobs, as described herein in accordance with various embodiments.

FIG. 2 illustrates an example diagram 200 showing one or more facilities 106 equipped with work stations where technicians can perform jobs in accordance with a schedule. In FIG. 2, a customer 110 interacts with a scheduling representative 202 of a facility 106 to have an item 112 serviced (e.g., an automobile 204 in FIG. 2). In various embodiments, the customer 110 may physically visit the facility 106 to interact with the scheduling representative 202 operating, or associated with, an entity device 104. In alternative embodiments, the customer 110 may use a customer device 114 to interact with the scheduling representative 202 (e.g., email or message via a network connection, talk over the phone via a network connection, etc.).

In some service environments, the scheduling representative 202 may be an employee responsible for interacting with the customer 110. Thus, the scheduling representative 202 may be expected to build a relationship with the customer 110 such that the customer 110 has a pleasant experience, and thus, may be likely to return to the facility 106 as a repeat customer in the future (e.g., the customer may be a client of the particular scheduling representative). As part of the customer relations, the scheduling representative 202 may interact with the customer 110 to determine reasons the customer wants to have the item serviced (e.g., possible problems with the automobile 204). The scheduling representative 202 may then provide input, via a graphical user interface, so that the job creation module 124 can create and store a work order and the scheduling module 126 can schedule, or help schedule, a service appointment for the customer 110.

In various embodiments, facilities may employ more than one scheduling representative to help a large number of customers. Each scheduling representative may be associated with a group of technicians that perform the jobs the scheduling representative creates. Conventionally, jobs scheduled by a particular scheduling representative are only dispatched to his or her own group of technicians. Thus, in many cases, a first scheduling representative whose technicians are currently unavailable to service an item is likely unaware that a technician belonging to a second scheduling representative may have current availability to service the item. By using the loading service 102 described herein, the first scheduling representative may be informed of the availability of the technician belonging to the second scheduling representative.

In the example diagram 200 of FIG. 2, the facility 106 may be an automobile repair or maintenance shop and the scheduling representative 202 may be referred to as an advisor. However, it is understood that the techniques and/or systems discussed herein may be implemented in facilities that service or produce other items as well.

As discussed above, the scheduling representative 202 may be responsible for creating a work order based on a discussion with the customer 110 and scheduling a job at the facility 106. Therefore, in various embodiments, the job creation module 124 is configured to receive input from the scheduling representative 202 to create various jobs 206(1) . . . 206(M) to be scheduled and performed. Each job 206(1) . . . 206(M) may be mapped to, or correlated with, a respective type 208(1) . . . 208(M). For example, each type 208(1) . . . 208(M) may be one of a variety of service types that may be pre-defined or pre-determined for a service facility. In various embodiments, the input provided by the scheduling representative 202 may be an explanation or description of a potential problem associated with an item (e.g., the automobile 204) that may need to be fixed or a concern of the customer regarding the item (e.g., an odd noise the automobile produces, a stiffness of the steering wheel, a broken transmission, etc.). The job creation module 124 may be configured to automatically map the input to a particular type of service or type of work (e.g., from a variety of service types or work types). Or the scheduling representative 202 may select or input the particular service type or work type. The number M may be a whole number (e.g., two, five, ten, fifteen, thirty, one hundred, etc.) and may be associated with a number of jobs scheduled to be processed by the one or more facilities 106 for a given period of time (e.g., a morning, an afternoon, a day, a week, a month, etc.).

In the example environment of an automobile repair or maintenance shop (e.g., a dealership service department), the various service types may include, but are not limited to, one or more of the following: a "general maintenance" service type that performs a comprehensive bumper-to-bumper diagnosis to maintain/fix a variety of different components of a gas-fueled automobile, a "brakes" service type that performs a diagnosis to maintain/fix the automobile brakes, an "electrical" service type that performs a diagnosis to maintain/fix the electrical components of the automobile (e.g., battery, lighting, windows, locks, displays, audio systems, computers, etc.), a "climate control" service type that performs a diagnosis to maintain/fix the automobile heating and cooling systems, a "gas engine repair—heavy line" service type that performs a diagnosis to maintain/fix a gas engine of larger automobiles (e.g., trucks or SUVs with larger engines), a "gas engine performance" service type that performs a diagnosis to optimize the performance of a gas engine, an "automatic transmission" service type that performs a diagnosis to maintain/fix an automatic transmission of an automobile, a "diesel engine repair" service type that performs a diagnosis to maintain/fix a diesel engine, a "diesel engine performance" service that performs a diagnosis to optimize the performance of a diesel engine, a "diesel general maintenance" service type that performs a comprehensive bumper-to-bumper diagnosis to maintain/fix a variety of different components of a diesel-fueled automobile, a "gas engine repair—light line" service type that performs a diagnosis to maintain/fix a gas engine of smaller automobiles (e.g., compact automobile, sedans, etc.), a "steering and suspension" service type that performs a diagnosis to maintain/fix the steering and suspension of an automobile, a "smog inspection" service type that performs a diagnosis to maintain/fix the emissions of an automobile, and a "interior/exterior trim" service type that performs a diagnosis to maintain/fix the interior/exterior trim of an automobile. Therefore, each of the types 208(1) . . . 208(M) for the respective jobs 206(1) . . . 206(M) may be one of the service types discussed in this paragraph.

The loading service 102 may pre-define or pre-determine the different types of service or work based on one or more factors. For instance, the loading service 102 may define or determine the different types based on different technician skills required to perform the service or the work. The loading service 102 may define or determine the different types based on a number of work stations equipped to perform the service or the work (e.g., tools, amount of space, etc.). The loading service 102 may define or determine the different types based on an estimated duration of time to complete a job of a particular type.

Therefore, each type 208(1) . . . 208(M) may be associated with a respective estimated duration of time to complete a job of the particular type. As seen in FIG. 2, a first job 206(1) may be of a first type 208(1) (e.g., an "electrical" service type) associated with a first estimated duration of time 210(1) (e.g., one hour). A second job 206(2) may be of a second type 208(2) (e.g., a "smog inspection" service type) associated with a second estimated duration of time 210(2) (e.g., thirty minutes). An Mth service job 206(M) may be of an Mth type 208(M) (e.g., a "diesel engine repair" service type) associated with an Mth estimated duration of time 210(M) (e.g., two hours). In various embodiments, different jobs (e.g., 206(1) . . . 206(M)) may be associated with a same type or a different service type, and/or different types may be associated with a same estimated duration of time to complete or a different estimated duration of time to complete.

An estimated duration of time (e.g., one of 210(1) . . . 210(M)) to complete jobs of a particular type may be based on a calculated historical average of tracked actual durations of time to complete previous jobs of the same type (e.g., within the last five days or the last month, etc.). As further discussed herein, the scheduling module 126 may use the estimated durations of time when assigning the jobs 206(1) . . . 206(M) to technicians and scheduling appointments (e.g., reserving time) for the jobs 206(1) . . . 206(M) within the technician schedules.

In various embodiments, each of the jobs 206(1) . . . 206(M) may also be associated with respective job label(s) 212(1) . . . 212(M). The job label(s) 212(1) . . . 212(M) may be associated with the job during the job creation process. The job labels 212(1) . . . 212(M) may provide information that the scheduling module 126 considers when finding available time slots for the scheduling or re-scheduling of a job. Accordingly, the scheduling module 126 may suggest or recommend an available time slot and/or a technician for a job to be scheduled or re-scheduled based on an analysis of the job labels. The scheduling module 126 may also use the job labels to visually distinguish between service appointments when a technician schedule is displayed within the facility schedule.

In a first example, a job label may indicate that an item scheduled to be serviced is located at the facility 106 (e.g., item is an "on premises" item). The scheduling module 126 may use this indication to determine that the initial scheduling and/or re-scheduling of a service appointment is flexible at least because the item to be serviced is on the premises and may be readily available to be serviced (e.g., opposed to an item that is not yet on the premises). Accordingly, in various embodiments, the scheduling module 126 may identify appointments with an on premises job label and/or notify, e.g., via the output of a graphical user interface, the scheduling representative of the appointments with an on premises job label so the scheduling representative can conveniently view jobs capable of being re-scheduled (e.g., to an earlier time slot due to an unexpected technician availability). In the example environment of an automobile repair or maintenance shop (e.g., a dealership service department), a "drive-in no appointment" or a "tow-in no appointment" job label may be labels indicating an automobile to be serviced or worked on is on the premises (e.g., whether the customer drove the automobile to the dealership or towed the automobile to the dealership). Consequently, an on premises job label provides scheduling flexibility as opposed to an "off premises" job label indicating that a job has been scheduled but the customer will not drop off the item until a later time, and thus, the item is not on the premises at a given time (i.e., the service facility may be unable to service an item that is not located at the service facility).

In a second example, a job label may indicate that a customer is waiting at, or around, the facility 106 for the servicing of their item to be completed. Thus, the scheduling module 126 may use this indication to prioritize the servicing of a waiting customer's item. That is, the scheduling module 126 may output a suggestion or recommendation indicating that a job with a "customer waiting" label is to be scheduled or re-scheduled as soon as possible so the customer can receive their serviced item and leave earlier. In contrast, the scheduling or re-scheduling of a job for a customer that is not waiting may not be prioritized. For instance, if the customer is not returning to pick up the item until the end of a work day at 5:00 PM it may not matter whether the item is serviced at 10:00 AM or 2:00 PM as long as the servicing is finished by 5:00 PM. In the example environment of an automobile repair or maintenance shop, a "traveler/waiter" job label may indicate that the customer is currently waiting, and thus, the scheduling module 126 may prioritize the scheduling of service jobs that have a "traveler/waiter" job label (e.g., notify the scheduling representative 202 to schedule or re-schedule a job with a traveler/waiter label to an earlier time slot). Accordingly, a job that is not labeled as a traveler/waiter (e.g., a non-waiting label) may provide an element of scheduling flexibility since the job can be scheduled or re-scheduled within a window of time (e.g., various times throughout the day) and customer expectations can still be met since the scheduling or re-scheduling does not affect the customer's planned pick-up time (e.g., at the end of the work day at 5:00 PM).

In a third example, a job label may indicate that a job is to be assigned to a technician who previously worked on the item. Since the previous technician may be familiar with the item and/or previous work performed on the item, the service facility benefits from assigning the job to a technician who previously worked on the item. Accordingly, the scheduling module 126 may be configured to access records indicative of previous jobs and identify the technician who previously worked on the item (e.g., correlate customer identification or item information to a previous job). In the example environment of an automobile repair or maintenance shop, a "re-check" job label may be a label used to indicate that a customer is bringing an automobile back, e.g., within a short amount of time, to have a re-occurring problem fixed. The scheduling representative 202 may then associate a "re-check" label with the job so the scheduling module 126 can identify the technician who previously worked on the item and output a suggestion or recommendation that the new job be scheduled in an available time slot of the same technician who previously worked on the item. Furthermore, a "special order part installation" job label may be used to indicate that an automobile is returning to the service facility to have a part installed after an initial job (e.g., the part may have been unavailable at the time the initial job was performed). Thus, the scheduling module 126 may suggest or recommend that a new job that has a "special order part installation" job label be scheduled with the same technician who performed the initial job as well.

In a fourth example, a job label may indicate that a job is to be assigned to a technician based on experience (e.g., a technician with a threshold amount of experience such as at least three out of a five star rating or a lead technician for jobs of a particular type). For instance, the scheduling module 126 may determine that the job is to be assigned to a technician that has more experience than a technician who previously worked on the item. In the example environment of an automobile repair or maintenance shop, the scheduling module 126 may be configured to suggest or recommend, e.g., to the scheduling representative 202, that a job with a "re-check new technician" label be scheduled with a more experienced technician (e.g., the shop foreman or the lead technician who has a highest possible star rating) since the previous technician with less experience was unable to successfully diagnose and fix the problem. Thus, the facility 106 may want to ensure that the problem is fixed during the subsequent visit so the customer is satisfied. A "first scheduled maintenance" job label may be another label used by the scheduling module 126 to suggest or recommend that a service job be scheduled with a more experienced technician because this job label may indicate that this the first opportunity for the entity operating the service facilities to please and/or impress the customer. Thus, the entity may want to ensure, or at least improve the likelihood, that customer expectations are met or exceeded, e.g., by using an experienced technician opposed to a new technician with limited experience.

In a fifth example, a job label may indicate that a job is part of a classification of jobs to be spread, or evenly distributed, across a group of technicians (e.g., to the extent possible). Thus, the scheduling module 126 may use this indication to assign the job to a technician in the group who is next in line to receive a job. In various implementations, the scheduling module 126 may use a round-robin approach to assign jobs with a label indicating even distribution amongst a group of technicians. In the example environment of an automobile repair or maintenance shop, a "recall" job label may be used in a scenario where an automobile is likely one of many automobiles of the same make and/or model that have been brought, or will be brought, to the shop as part of a manufacturer recall process (e.g., to address a safety concern). The scheduling module 126 may be configured to suggest or recommend a technician and/or a time slot for a job with a recall label so that even distribution, or close to even distribution, amongst technicians is achieved. At least one reason the facility may attempt to distribute service jobs with a recall label evenly amongst the technicians is because the technicians do not prefer recall-labeled jobs due to decreased commissions (i.e., the technicians do not earn as much money).

In various embodiments, a job label may be associated with a particular type of job. For example, a recall job label may be associated with a pre-defined job type such as "brakes" when a manufacturer implements a recall to fix a manufacturing brakes issue. Thus, the scheduling module 126 may attempt to evenly distribute the recall-labeled jobs to fix the brakes issue to technicians that have skills associated with a "brakes" service type. In another example, a recall job label may be associated with a pre-defined job type such as "electrical" when a manufacturer implements a recall to fix a manufacturing electrical issue. In other embodiments, a job label may be more specific and/or unassociated with a broader pre-defined type of job. Thus, the loading service 102 may establish a temporary type of job for a specific label with an estimated duration of time to complete. For example, a recall service type may be established for a period of time (e.g., a week, a month, six months, a year, etc.) to fix issues associated with a seat belt so the seat belt better protects infants. In this example, the service appointments are directed to fixing the seat belts but, in many instances, fixing seatbelts may not be a typical type of job performed by an automobile dealership service department.

The job labels discussed above are provided as examples, and it is understood in the context of this document, that other job labels may be accessed and considered by the scheduling module 126 when scheduling or re-scheduling a job and outputting a suggestion or recommendation (e.g., a time slot and/or a technician) associated with the scheduling or re-scheduling of a job.

The loading service 102 is configured to store the jobs 206(1) . . . 206(M) and their respective information (e.g., the type, the estimated duration of time to complete, the job labels, customer information, etc.) in the work order information database 128 so that the information is accessible.

The loading service 102 may further store information (e.g., names, employee numbers, social security numbers, etc.) that identifies technicians 214(1) . . . 214(K) that operate the work stations 108(1) . . . 108(N) of the service facilities 106. The number K is a whole number representing the number of technicians that work at the service facilities (e.g., three, five, ten, fifteen, thirty, one hundred, etc.) or are dispatched by an entity or the service facilities (e.g., yard work teams, roofing teams, etc.). Thus, the technicians 214(1) . . . 214(K) may be employed or contracted by the entity operating the service facilities 106. Each technician 214(1) . . . 214(K) may be associated with respective skills 216(1) . . . 216(K) and respective skill levels 218(1) . . . 218(K). Moreover, each technician 214(1) . . . 214(K) has a respective technician schedule 220(1) . . . 220(K).

The skills (e.g., 216(1) . . . 216(K)) of a technician provide an indication of a type of work or service for which the technician has been trained or for which the technician is approved to perform. In various embodiments, the skills may indicate particular qualifications and/or certifications of the technician. In some instances, an individual technician may be skilled to perform multiple types of work or service (e.g., "brakes" and "steering and suspension").

The skill levels (e.g., 218(1) . . . 218(K)) provide an indication of an amount, or degree, of experience of a technician. For instance, the skill levels may be determined based on a number of years on the job, a number of service jobs performed, employee performance evaluations, customer feedback, etc.

As discussed above, an individual technician schedule (e.g., one of 220(1) . . . 220(K)) comprises the scheduled work or service appointments (e.g., associated with jobs) and/or reserved personal time for the technician (e.g., vacation, lunch break, doctor's appointment, etc.) for a given period of time (e.g., a day, a week, a month, etc.).

In various embodiments, the scheduling module 126 is configured to access the individual technician schedules 220(1) . . . 220(K) and generate a facility schedule 222. The facility schedule 222 may represent a specified period of time such as a particular date, e.g., Monday, Mar. 17, 2014, a week, a month, and so forth. In some implementations, the scheduling module 126 may determine which technicians are scheduled to work during the specified period of time and generate the facility schedule 222 based on the determination such that technicians not working during the specified period of time may not be included.

Additionally, the scheduling module 126 uses one or more of a type of work or service, an estimated duration of time to complete a type of job or a job label associated with a job to identify one or more available time slots 224 within the facility schedule 222 or within an individual technician schedule. For example, the scheduling module 126 is configured to correlate a type of job (e.g., one of 208(1) . . . 208(M)) to a technician skill (e.g., 216(1) . . . 216(K)) and/or a technician skill level (e.g., 218(1) . . . 218(K)) to ensure that a job is performed by a technician that has the proper training and/or appropriate qualifications to service the item correctly. In another example, the scheduling module 126 may be configured to correlate a job label (e.g., one of 212(1) . . . 212(M)) to a technician skill (e.g., 216(1) . . . 216(K)) and/or a technician skill level (e.g., 218(1) . . . 218(K)) to ensure that a job is performed by a technician with more experience. The scheduling module 126 uses the estimated duration of time to complete (e.g., one of 210(1) . . . 210(M)) to make sure an available time slot is large enough to accommodate a particular type of job. The scheduling module 126 may not determine that an unreserved thirty minute time period in a technician schedule is a time slot available to schedule a service job estimated to take one hour to complete.

Moving on, FIG. 2 illustrates technician 214(1) operating a first work station 108(1) and technician 214(K) operating work station 108(N). Each technician may use a work station device to view their respective technician schedule, e.g., 220(1) or 220(K), for a specified period of time. Accordingly, the loading service 102 assigns and schedules the jobs 222 to the work stations 108(1) . . . 108(N) and technicians in accordance with the facility schedule 222 made up of individual technician schedules (e.g., 220(1) . . . 220(K)).

For example, upon arriving to work at the facility 106 in the morning, technician 214(1) may use work station device 116(1) to view his or her scheduled appointments for the day. In accordance with his or her schedule and as the day progresses, technician 214(1) may complete job 206(1) of type 208(1), job 206(3) of type 208(3) and so forth. In some cases, job 206(1) and job 206(3) may be of the same type (e.g., "electrical" service type) and the technician 214(1) has skills 216(1) indicating he or she is trained and/or qualified to perform the service. In other cases, job 206(1) and job 206(3) may be of a different type (e.g., "electrical" service type and "climate control" service type) and the technician 214(1) has skills 216(1) indicating he or she is trained and/or qualified to perform both types of service. Similarly, technician 214(K) may use work station device 116(K) to view his or her scheduled appointments for the day. In accordance with his or her schedule and as the day progresses, technician 214(K) may complete job 206(2) of type 208(2), job 206(4) of type 208(4) and so forth.

In various embodiments, the technicians (e.g., 214(1) and 214(K)) provide technician input 224 on their respective schedules, e.g., via the work station devices 116(1) and 116(K). For instance, after viewing his or her own technician schedule, a technician may provide input indicating that an initial amount of time reserved by the scheduling representative 204 for an initial scheduled appointment (e.g., the estimated duration of time to complete) is not enough time to complete the job or more than enough time to complete the job. Accordingly, the technician may provide, as the technician input 224, a revised amount of reserved time based on his or her analysis of the service job and/or diagnosis of the item. The technician may provide an indication and/or make a revision because, in many instances, the technician can better predict or estimate the amount of time to perform the job (e.g., compared to a default estimate or an estimate set by the scheduling representative 202).

The discussion herein provides example processes and example graphical user interfaces to further describe the techniques and/or systems. The example processes described are each illustrated as a logical flow graph, each operation of which may represent a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 3:
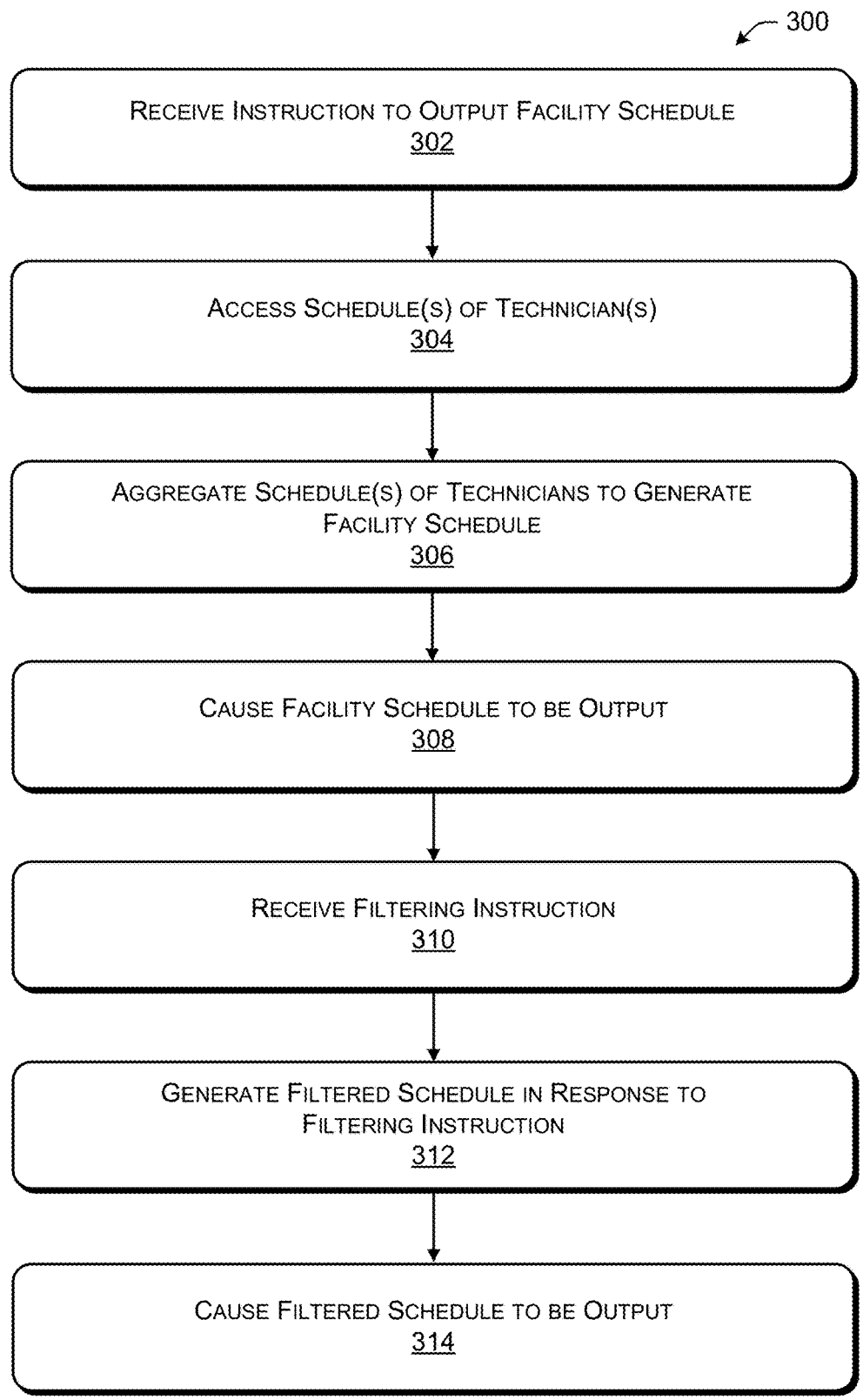
FIG. 3 is a flow diagram showing an example process that generates a facility schedule to be output and/or filtered, as described herein in accordance with various embodiments.

FIG. 3 describes an example process 300 that generates a facility schedule to be output and/or filtered. For example, the scheduling representative 202 may view the facility schedule, e.g., via an entity device 104, upon arriving at the facility 106 in the morning to see how an individual facility, or multiple facilities, is/are loaded for a given time period (e.g., the current day). In various embodiments, individual operations described with respect to FIG. 3 may be performed by various ones of the devices discussed with respect to FIGS. 1 and 2.

At 302, the scheduling module 126 may receive an instruction to output the facility schedule (e.g., facility schedule 222). For instance, the instruction may specify a particular period of time (e.g., a specific two hour block of time, a morning service session, an afternoon service session, the current day, a specified day in the future, etc.). The scheduling module 126 may receive the instruction from the scheduling representative 202 (e.g., an advisor, a supervisor, a manager, a secretary, etc.), a technician, a customer or any other person who may want to view the facility schedule comprising individual technician schedules. Moreover, the instruction may include an indication to view the facility schedule for a particular facility (e.g., where the scheduling representative is working for the day) or multiple facilities.

At 304, the scheduling module 126 may access individual schedules of technicians. For example, the scheduling module 126 may access the technician schedules 220(1) . . . 220(K) stored in the schedule information database 130. In various embodiments, the scheduling module 126 may access technician schedules for technicians that work at a particular facility or a larger group of technicians that work across multiple facilities. As discussed above, the technician schedules may include work-related time slots reserved for appointments as well as personal time slots indicating that a technician is unavailable to work due to a personal matter such as a sickness, a vacation, a doctor appointment, a lunch break, a morning and/or afternoon break, or other reason to reserve time for personal use.

At 306, the scheduling module 126 may aggregate the individual schedules of the technicians to generate the facility schedule. Thus, the facility schedule may be a master schedule that lists, in rows or columns, individual technician schedules and that visually distinguishes between the technician schedules. The facility schedule may also visually distinguish between scheduled appointments and/or time reserved for personal use. In some instances, the scheduling module 126 continually updates the facility schedule based on any schedule changes and stores the facility schedule in the schedule information database 130.

At 308, the scheduling module 126 may cause the facility schedule to be output (e.g., displayed). For example, the scheduling module 126 may be instructed to output the facility schedule at an entity device 104 being operated by the scheduling representative 202. In another example, the scheduling module 126 may be instructed to transmit or communicate the facility schedule to another device so that it can be output on the other device (e.g., a different entity device 104, a work station device 116, a customer device 114, etc.). Accordingly, the scheduling representative 202 or other observer of the facility may be able to quickly view how the shop is loaded and determine if the work-load is in balance (e.g., even distribution of work amongst two or more technicians or close to even distribution of work amongst two or more technicians) or if there is an imbalance in the work-load (e.g., at least one technician is over-booked and/or at least one technician is under-booked).

At 310, the scheduling module 126 may receive a filtering instruction. In various embodiments, the scheduling representative 202 may provide input defining the filtering instruction so that a particular subset of technician schedules and/or scheduled appointments within the facility schedule can be viewed. For instance, the scheduling representative 202 may want to view appointments associated with jobs that have a particular type and/or a particular job label. Moreover, the scheduling representative 202 may want to view appointments associated with jobs to be performed by a specific technician and/or by a particular group or team of technicians that are associated with a particular scheduling representative.

In some implementations, the filtering instruction may be provided in accordance with the instruction received in operation 302 such that a filtered schedule may be directly output without outputting the facility schedule first.

At 312, the scheduling module 126 may generate a filtered schedule in response to receiving the filtering instruction. For example, the scheduling module 126 may identify jobs of a particular type or jobs that have a particular label assigned. In another example, the scheduling module 126 may determine technicians that belong to a particular group or team (e.g., associated with a specific advisor).

At 314, the scheduling module 126 may cause the filtered schedule to be output. In various embodiments, the scheduling module 126 may output the filtered schedule in a configuration that only displays the filtered schedule information (e.g., the jobs of a particular type, or the schedules of technicians on a particular team). In other embodiments, the scheduling module 126 may output the filtered schedule in a configuration that visually distinguishes the filtered schedule information from other information (e.g., via highlighting, bold colors, larger font, etc.).

Figure 4:
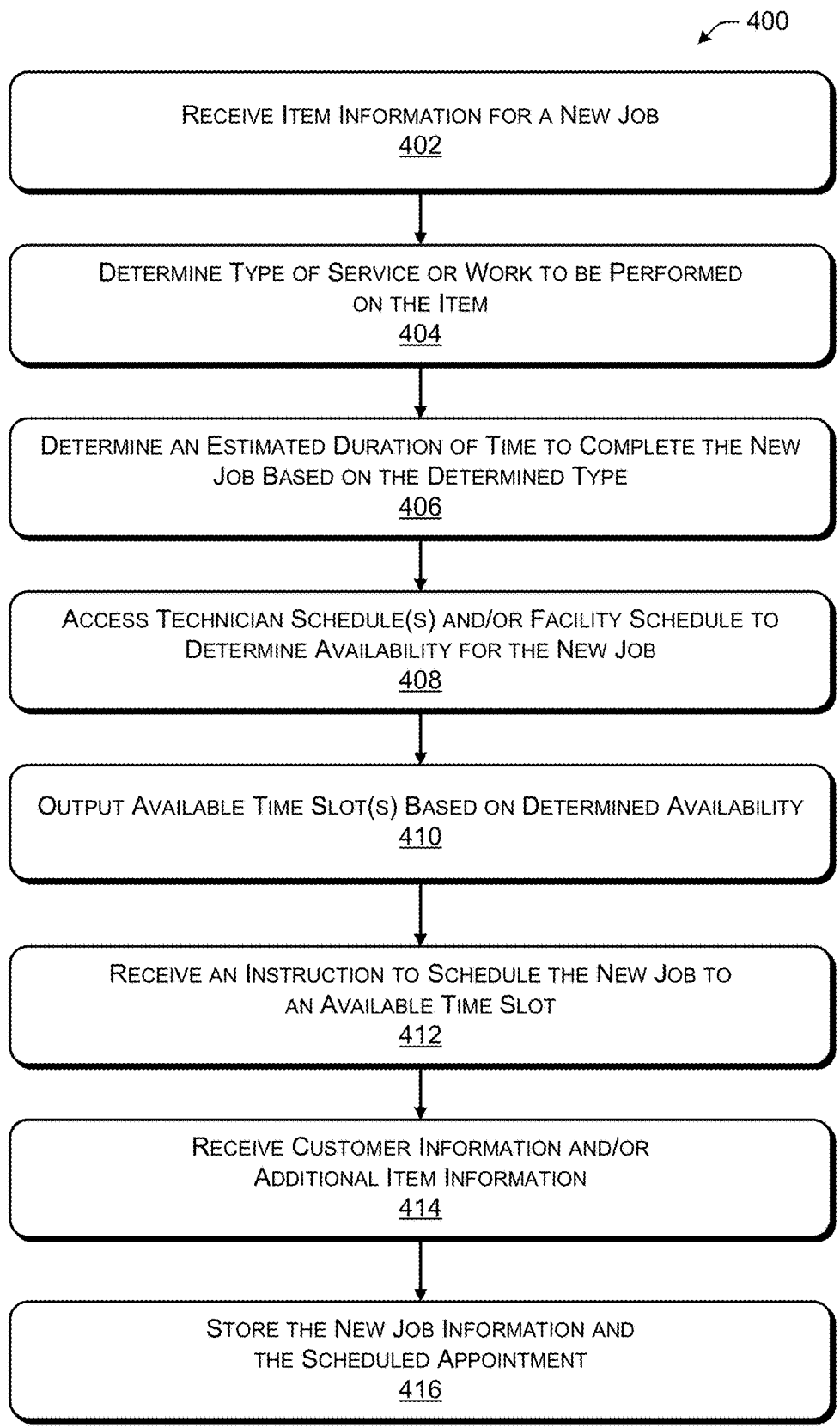
FIG. 4 is a flow diagram showing an example process that determines availability of one or more technicians and assigns a new job based on the determined availability, as described herein in accordance with various embodiments.

FIG. 4 describes an example process 400 that determines availability of technicians and assigns a new job based on the determined availability. In various embodiments, individual operations described with respect to FIG. 4 may be performed by various ones of the devices discussed with respect to FIGS. 1 and 2.

At 402, the job creation module 124 may receive item information for a new job. The item information may comprise one or more of an indication of a type of work or service to be performed on an item, customer concerns about an item, and/or a timeframe to perform the service or work (e.g., as soon as possible, anytime today, tomorrow, in two days, a day next week, etc.). For instance, the item information may comprise an explanation that describes a problem with an item 112 or work the customer desires to be performed on the item 112. The item information may be verbally communicated from the customer 110 to the scheduling representative 202 and then the scheduling representative 202 may input the item information at the entity device 104. Or, the item information may be input by the customer 110 via a customer device 114 or another device and communicated to the job creation module 124 of the entity device 104 via network(s) 118. In some implementations, the item information may also include information indicative of, or associated with, a job label (e.g., 212(1) . . . 212(M)).

At 404, the job creation module 124 may determine a type of service or work to be performed on the item. In various embodiments, the job creation module 124 may be configured to automatically determine a type of service or work based on an analysis of the item information. For example, the job creation module 124 may identify keywords in the input and associate keywords with a service type (e.g., associate "heater" and "air conditioning" with a "climate control" service type). In other embodiments, the job creation module 124 may receive input such as a menu selection, e.g., from the scheduling representative 202, that selects the service type. Further, in various embodiments, the job creation module 124 may be configured to automatically determine or derive a job label to assign to the new job based on an analysis of the item information. For example, the item information may indicate that the customer realized that Car Company ABC indicated there is an issue with the brakes for a particular make and model of a car and the job creation module 124 may determine or derive a recall label to be associated with the job. The job creation module 124 may alternatively receive input such as a menu selection, e.g., from the scheduling representative 202, that selects a job label after the scheduling representative 202 considers the item information.

At 406, the job creation module 124 may determine an estimated duration of time to complete the new job based on the determined type (e.g., 210(1) . . . 210(M)). For example, the loading service 102 may track the actual durations of time to complete jobs of a particular type over a period of time (e.g., the last five days, the previous month) and calculate an average amount of time based on the actual durations of time. The loading service 102 may then use the average amount of time as the estimated duration of time to complete jobs of a particular type. In some instances, the scheduling representative or a technician may override the initial estimated duration of time to complete (e.g., which may be a default setting) based on consideration of the item information and provide an adjusted or revised estimated duration of time to complete.

At 408, the job creation module 124 may access individual technician schedules (e.g., 220(1) . . . 220(K)) to determine technician availability. As discussed above, in various embodiments, the individual technician schedules may be aggregated into a facility schedule, and thus, the job creation module 124 may access the facility schedule to determine technician availability as well. As an example, if the estimated duration of time to complete the job of a particular type is one hour, then the job creation module 124 may access the schedule information for technicians capable of performing the job to identify one hour time slots that are not yet reserved for other appointments or personal matters (i.e., the time slots are open or available for appointments to be assigned). As discussed above, technician availability may depend on the skills (e.g., 216(1) . . . 216(K)) and skill level (e.g., 218(1) . . . 218(K)) of the individual technicians. Moreover, the scheduling module 126 may also consider job labels (e.g., 212(1) . . . 212(M)) when determining technician availability.

At 410, the job creation module 124 may output available time slots for technicians. For instance, the job creation module 124 may display the facility schedule 222 and visually distinguish between time slots available for the scheduling of an appointment and time slots that are unavailable for the scheduling of the appointment. In some instances, the job creation module 124 may recommend one or more available time slots, e.g., based on a job label.

At 412, the job creation module 124 may receive an instruction to schedule the new job to an available time slot. In other words, the instruction may assign the new job to a technician and reserve time (e.g., the estimated duration of time to complete) for an appointment within the technician's schedule.

In various embodiments, the scheduling representative 202 may instruct (e.g., provide input) the job creation module 124 to assign the new job based on an agreement communicated from the customer 110 to have an item serviced. The agreement may be communicated after information regarding the timing of the scheduled appointment and/or the identification of the technician is/are communicated to the customer. For example, using the scheduling and shop loading techniques provided herein, the scheduling representative 202 can inform the customer that "we are estimating that your item will begin to be serviced today at 2:00 pm and will be finished by 3:00 pm" and the technician scheduled to service your item is Joe F.

In various embodiments, at 414, the job creation module 124 may receive customer information and/or additional item information (e.g., if this information is not provided via operation 402). The customer information may include identification (e.g., a first and/or last name), a phone number, an address and so forth. In some instances, the customer information may be previously stored and accessed for a repeat customer. The additional item information may include information not communicated in operation 402, e.g., item specifics such as a year of manufacture of an item 112, an identification of a company that makes an item, a model or version number of an item, and/or a color of an item (e.g., a blue 2008 Toyota Camry, a white 2012 Ford F250 pick-up). The additional item information may be used to distinguish one item 112 from another (e.g., identify an automobile 204).

At 416, the job creation module 124 may store the new job information, e.g., via a work order, in the work order information database 128. Moreover, the job creation module 124 may store the scheduled appointment for the technician schedule. Even further, the job creation module 124 may update the facility schedule to reflect the scheduling of the appointment for the new job.

The example process 400 may be repeated for each customer 110 that instructs the facility 106 to service an item 112 and/or for each new job to be assigned to a technician.

Figure 5:
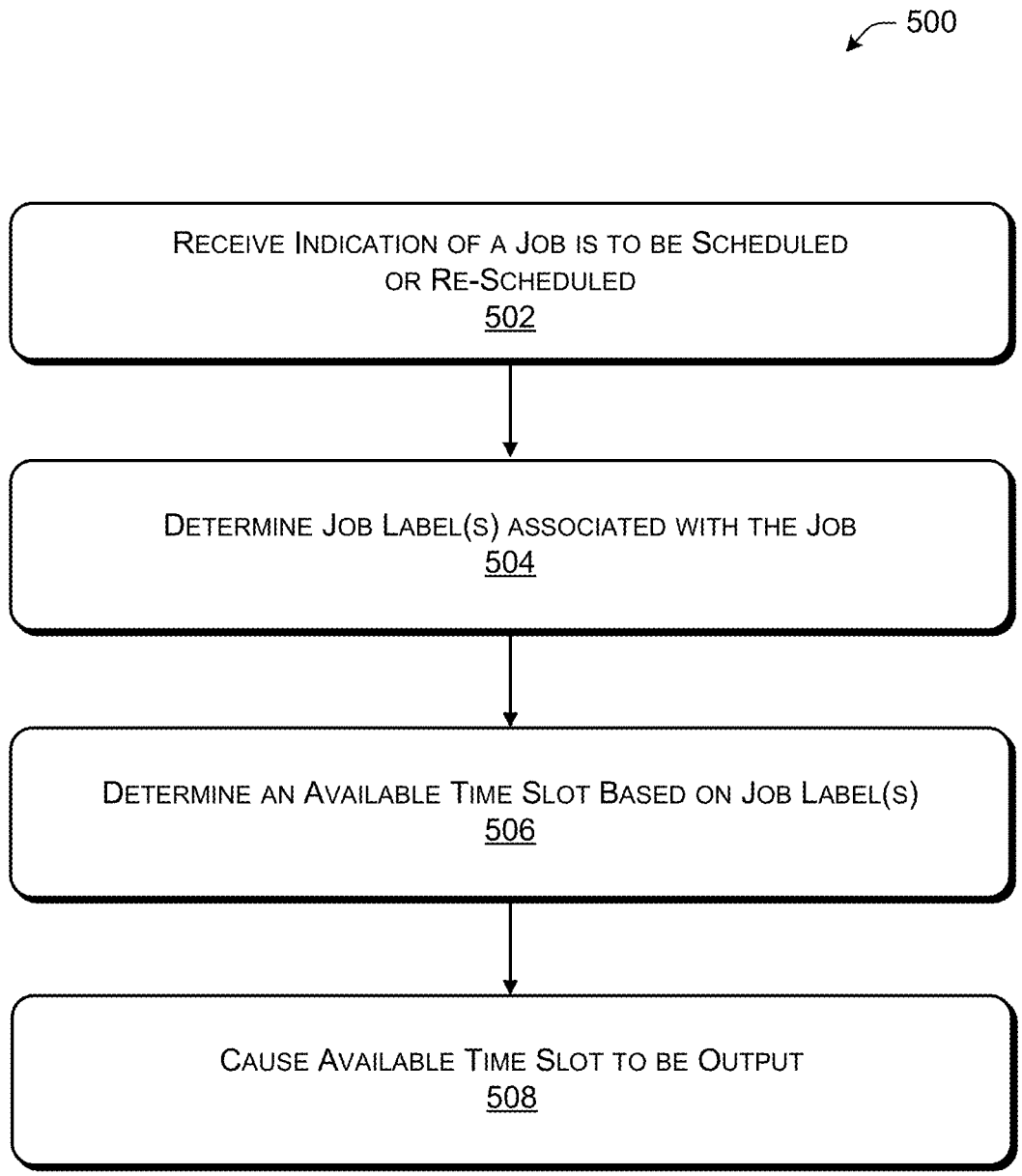
FIG. 5 is a flow diagram showing an example process that schedules or re-schedules service jobs based on a job label, as described herein in accordance with various embodiments.

FIG. 5 describes an example process 500 that schedules or re-schedules service jobs based on a job label. For example, the example process 500 may be performed in conjunction with operation 408 from FIG. 4. In another example, the example process may be performed when a job is to be re-scheduled (e.g., based on technician input 224). In various embodiments, individual operations described with respect to FIG. 5 may be performed by various ones of the devices discussed with respect to FIGS. 1 and 2.

At 502, the scheduling module 126 may receive an indication that a job is to be scheduled or re-scheduled. In at least one embodiment, the received indication is based on technician input indicating that a job is to be re-scheduled because of a conflict (e.g., as discussed with respect to FIG. 6). In at least one embodiment, the received indication is based on technician input indicating that a job is to be re-scheduled because on a technician availability (e.g., as discussed with respect to FIG. 7).

At 504, the scheduling module 126 may determine one or more job labels associated with the job. For example, a job label may indicate that (i) a customer is waiting or not waiting for the job to be completed, (ii) the job is of a particular classification to be evenly distributed, (iii) the job is to be assigned to a technician who previously worked on the item, or (iv) the job is to be assigned to a technician based on skill level (e.g., assign a job to a more experienced technician).

At 506, the scheduling module 126 may access the facility schedule and/or individual technician schedules to determine one or more available time slots based on the determined job labels.

At 508, the scheduling module 126 may cause the one or more available time slots to be output. In various embodiments, the scheduling module 126 may identify all the available time slots for multiple technicians within a given time period (e.g., current day, a specified date, a week, etc.) and display all the available time slots within the facility schedule. The scheduling module 126 may then receive input, e.g., from the scheduling representative 202, selecting an available time slot to which the job is to be assigned. In some instances, the scheduling module 126 may suggest or recommend one of the available time slots, e.g., via a visual notification or distinction, for selection (e.g., the earliest available time slot, a time slot with the most experienced technician).

As discussed above, the suggested or recommend available time slots may be based on the determined job labels. For example, the scheduling module 126 may identify and recommend the earliest possible time slot if a customer is waiting for the job to be completed. In another example, the facility may operate in accordance with a scheduling policy that evenly distributes jobs of a particular classification (e.g., the "recall" label), and thus, the scheduling module 126 may access information associated with previous scheduling, identify the next technician in line to be assigned the job based on the scheduling policy (e.g., round-robin assignment to achieve even distribution) and find a time slot available in the next technician's schedule to recommend. In yet another example, the scheduling module 126 may access previous job information and determine a technician who previously worked on the item and then find a time slot available in the technician's schedule to recommend (e.g., for a "re-check" label or a "special order part installation" label). In a further example, the scheduling module 126 may determine a technician based on skill level and recommend an available time slot in the technician schedule (e.g., assign a job with a "first scheduled maintenance" label to a more experienced technician).

In various embodiments, the scheduling module 126 considers multiple job labels when determining available time slots and recommending available time slots. The scheduling module 126 may be configured to consider the labels in light of a priority. For example, the scheduling module 126 may determine that a job associated with a waiting customer label and a recall label is to be assigned to a technician that can perform the job earlier rather than be assigned to the next technician in line to perform the job based on an even distribution policy. This prioritizes the customer experience over an "even distribution" policy based on technician commissions (e.g., prioritizes the customers over employees of the facility).

In further embodiments, the scheduling module 126 may automatically assign the job to a recommended available time slot and provide a notification, e.g., to the scheduling representative 202 via an entity device 104, of the automatic job assignment and appointment scheduling. For example, the scheduling module 126 may automatically assign a job in accordance with an even distribution policy and then provide a notification for a scheduling representative to review the assignment. The scheduling representative can then re-schedule the job if there is an issue with the automatic assignment.

Figure 6:
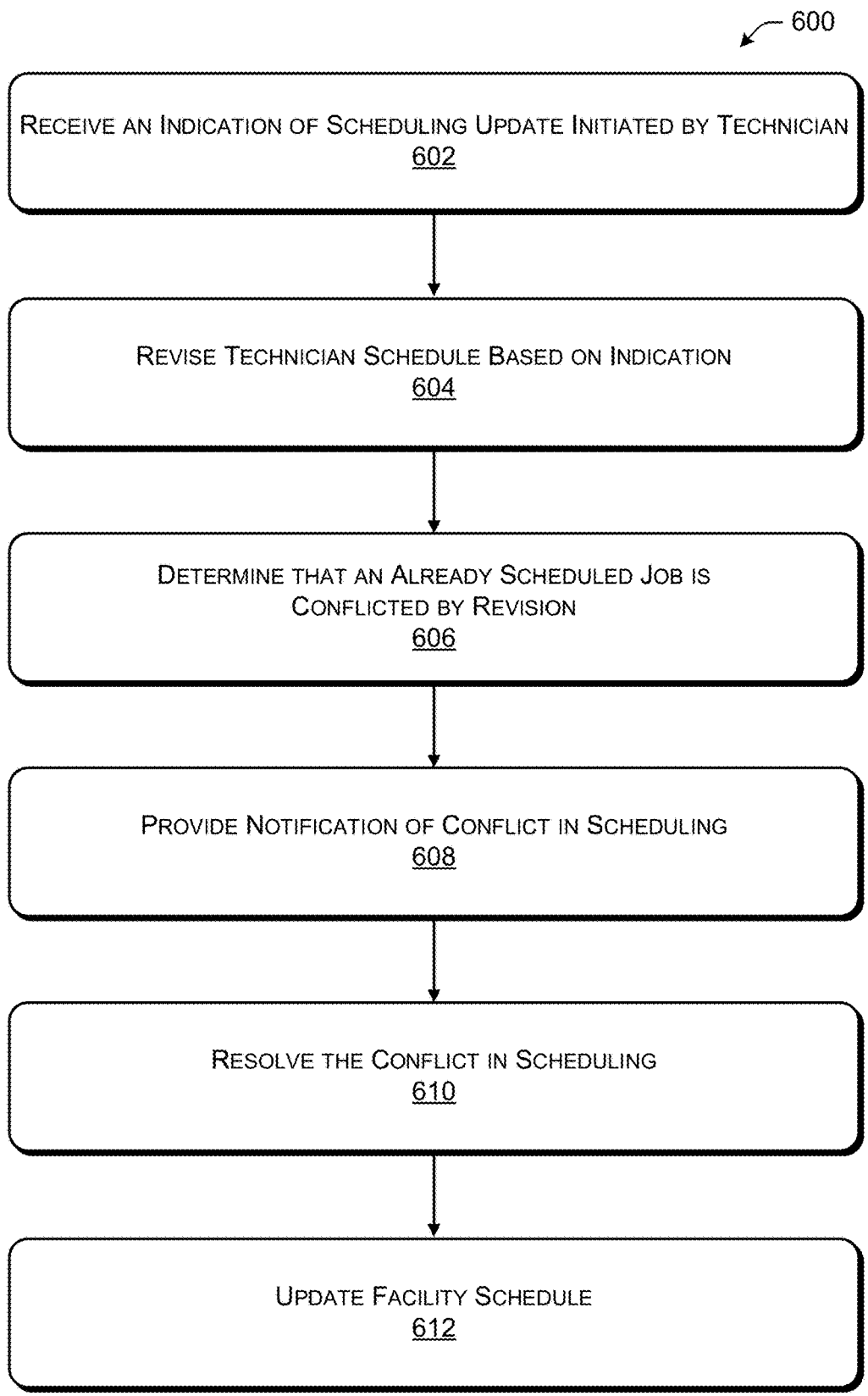
FIG. 6 is a flow diagram showing an example process that re-schedules an appointment based on technician input that causes a scheduling conflict, as described herein in accordance with various embodiments.

FIG. 6 describes an example process 600 that re-schedules an appointment based on technician input that causes a scheduling conflict. In various embodiments, individual operations described with respect to FIG. 6 may be performed by various ones of the devices discussed with respect to FIGS. 1 and 2.

Typically, service environments do not implement systems that allow skilled technicians to view their schedules and/or to provide input regarding their own work-load. Rather, the technicians typically complete one service job and then ask the representative for the next service job. Consequently, the scheduling is not based on real-time, knowledgeable input from technicians. The loading service 102 described herein is configured to receive input from the technicians, e.g., via work station devices 116.

At 602, the scheduling module 126 may receive an indication of a scheduling update initiated by a technician. For example, while performing a current job, the technician may realize that the current job is going to take more time than estimated as a result of identifying additional problems with the item or determining that the service needed to fix an original problem is more extensive. In another example, the technician may view, e.g., via a work station device, scheduled appointments in advance (e.g. for the whole day), and based on the item information known at the time and presented to the technician (e.g., a primary concern description, an explanation of a sound an automobile makes or how the automobile performs, etc.), the technician may revise an initial estimate of time to complete (e.g., 210(1) . . . 210(M)) based on the technician's own skilled knowledge (e.g., reserve additional time for the appointment). In yet another example, the technician may have to update his schedule to indicate that he is leaving work to address a personal matter (e.g., pick up a sick kid from school). The technician may provide the indication to the entity device 104 via use of a work station device 116.

In various embodiments, a scheduling representative may also initiate a schedule update to a technician schedule. For example, a customer may arrive at the facility to have an item repaired and the repair may be an urgent or emergency repair that, for various reasons, the scheduling representative may want to prioritize. Accordingly, the scheduling representative may seek to schedule an appointment for the urgent or emergency repair as soon as possible which may conflict with an already scheduled appointment (e.g., if the shop is busy and/or fully booked at the time).

At 604, the scheduling module 126 may revise the technician schedule based on the indication received. For example, if an initial duration of time reserved for the scheduled appointment (e.g., current or future) is one hour and the technician input indicates that an additional hour is needed to complete the job, the scheduling module 126 may extend the amount of reserved time by one hour so the revised amount of time reserved is two hours.

At 606, the scheduling module 126 may determine that an already scheduled job in the technician schedule is conflicted by the revision. For instance, as a consequence of extending a current appointment or future appointment by one hour, the scheduling module 126 may determine that a next or subsequent appointment for which the one hour was previously or already reserved within the technician schedule may be conflicted by the revision.

At 608, the scheduling module 126 may provide or output a notification of the conflict in scheduling. The scheduling module 126 is implemented to communicate a notification of the conflict, e.g., to a scheduling representative 202, so actions can be taken to proactively address the conflict so that the facility continues to operate efficiently and so that customer expectations can be satisfied.

At 610, the scheduling module 126 may resolve the conflict in scheduling. In various embodiments, the scheduling module 126 may be configured to determine and output one or more available time slots within the facility schedule, as discussed above (e.g., based on type of service or work, technician skills, technician skill levels, job labels), so that the already scheduled appointment conflicted out of the reserved time may be re-scheduled. After displaying the available time slots for re-scheduling, the scheduling module 126 may receive input, e.g., from the scheduling representative 202 via an entity device 104, selecting an available time slot for re-scheduling the next or subsequent job thereby resolving the conflict.

In various embodiments, the scheduling module 126 may access job labels for other jobs to recommend available time slots and resolve the conflict. For example, the next or subsequent job that was conflicted out of the reserved time (e.g., initially scheduled to start at 1:00 PM) may be labeled as a waiting customer, and thus, the facility wants to complete the service as soon as possible so the customer doesn't have to wait for extended periods of time. If another job to be performed by another capable technician is scheduled to start at the same time (e.g., 1:00 PM) but the customer is not waiting (e.g., a "non-waiting" customer) but rather returning at 5:00 PM to pick up their item, then the scheduling module 126 may recommend that the scheduling representative 202 re-schedule the other job to a later time slot (e.g., 3:00 PM or 4:00 PM) and re-schedule the next or subsequent job with the other capable technician.

Accordingly, the scheduling module 126 may be configured to access and analyze information about multiple jobs and scheduled appointments within the facility schedule to determine an optimized resolution to a scheduling conflict that pleases customers and maintains efficient facility operations. In various embodiments, the scheduling module 126 may automatically re-schedule a job to a recommended time slot to resolve the conflict in scheduling.

At 612, the scheduling module 126 may update the facility schedule based on the input received and the resolution to the conflict in scheduling.

Figure 7:
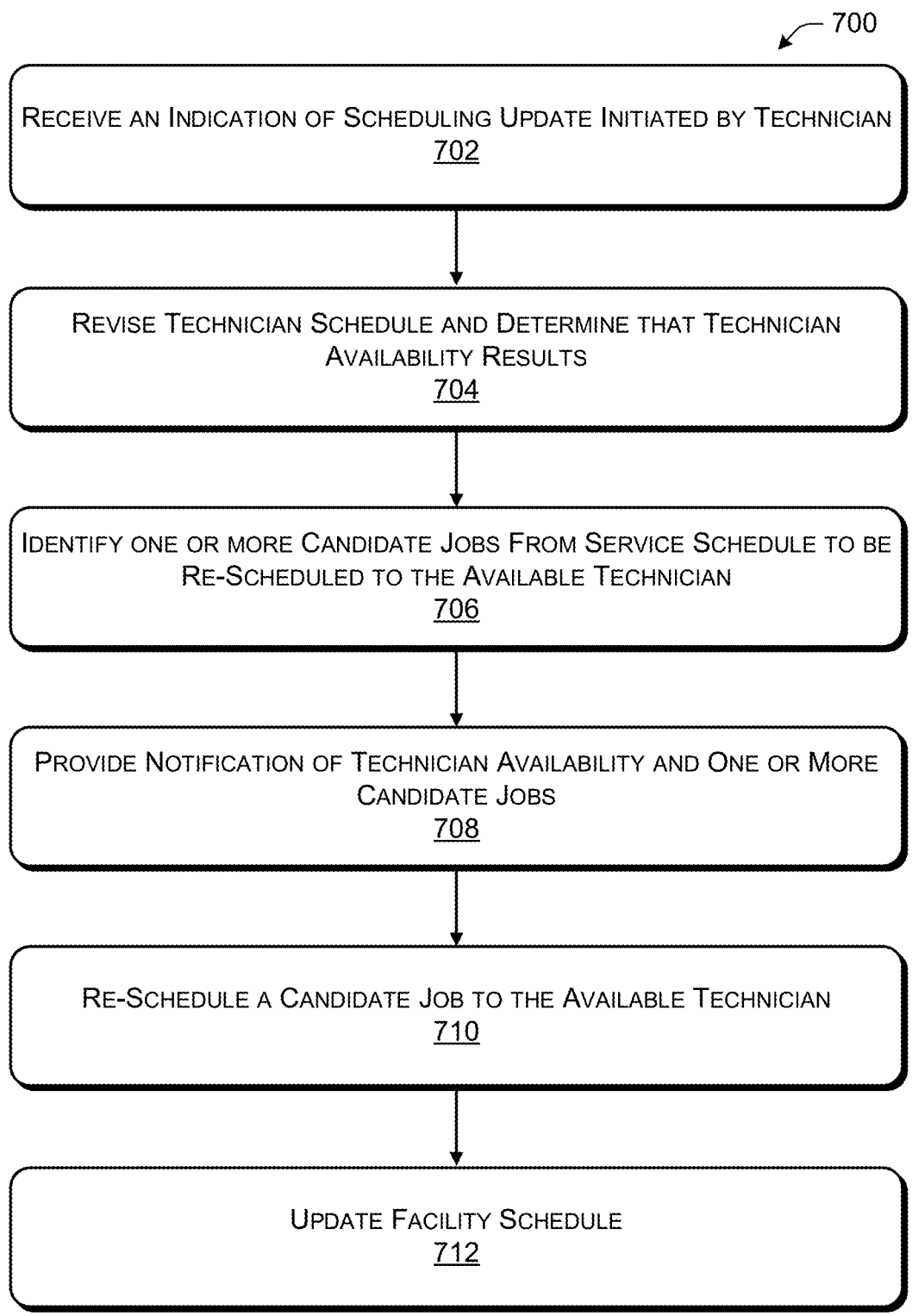
FIG. 7 is a flow diagram showing an example process that re-schedules an appointment based on technician input that causes technician availability, as described herein in accordance with various embodiments.

FIG. 7 describes an example process 700 that re-schedules an appointment based on technician input that causes technician availability. In various embodiments, individual operations described with respect to FIG. 7 may be performed by various ones of the devices discussed with respect to FIGS. 1 and 2. In at least one embodiment, the example process 700 may be implemented At 702, the scheduling module 126 may receive an indication of a scheduling update initiated by a technician. For example, the scheduling update may indicate that it did not take as much time as estimated to complete a current job. In another example, the scheduling update may indicate that the technician does not think it will take as much time as estimated to complete a future job on his schedule. In some implementations, the received indication may be based on a canceled appointment (e.g., customer cancellation communicated to the scheduling representative 202 who then confirms the cancellation via the loading service 102).

At 704, the scheduling module 126 may revise the technician schedule based on the indication received and determine that technician availability results from the revision. For example, if a job was scheduled to take an hour to complete and the scheduling update indicates that the technician completed the job in thirty minutes, then an unexpected or unscheduled availability of thirty minutes results such that the technician is currently available or will be available in the future.

At 706, the scheduling module 126 may identify one or more candidate jobs from the facility schedule capable of being re-scheduled to the technician based on the determined availability. For instance, the scheduling module 126 may evaluate job labels to determine candidate jobs (i) associated with a label indicating that the item is on the premises, (ii) associated with a label indicating that there is a waiting customer, and/or (iii) that have an estimated duration of time to complete that fits within the time window of technician availability (e.g., thirty minutes that unexpectedly opened up). The facility may want to perform a job for a waiting customer earlier so the customer does not have to wait as long. If the facility is not busy when the unexpected technician availability is realized, the item on premises label allows jobs scheduled for a later time (e.g., the next day) to be performed so the technician does not sit idle.

At 708, the scheduling module 126 may provide or output a notification, e.g., to a scheduling representative via an entity device, of the technician availability and the one or more candidate jobs.

At 710, the scheduling module 126 may re-schedule one of the candidate jobs to the available technician, e.g., so the technician does not sit idle. In various embodiments, the scheduling module 126 may receive input, e.g., from a scheduling representative via an entity device, selecting a candidate job to be re-scheduled. In alternative embodiments, the scheduling module 126 may automatically select a candidate job to re-schedule based on the job labels.

At 712, the scheduling module 126 may update the facility schedule after a candidate job has been re-scheduled to the technician availability.

As described above, the loading service 102 may generate and maintain a facility schedule that (i) helps a scheduling representative schedule an appointment for a new job based on a type of work or service be performed and technician availability, (ii) can be updated to reflect technician input (e.g., a revision to a reserved amount of time to complete the job based on a skilled technician analysis and diagnosis of the problem), and (iii) can use notifications and/or visual indicators so various scheduling representatives and technicians are informed of a change in the facility schedule and can react to the change in the facility schedule in an efficient manner.

This disclosure contains discussion corresponding to various example graphical user interfaces. The example graphical user interfaces are used to further illustrate the techniques and/or systems discussed above in the context of an auto repair and maintenance shop (e.g., a car dealership service department). It is understood, that the techniques and/or systems discussed above may also be implemented in other service or work environments (e.g., a hair salon, an accounting firm, a landscaping company, a yard maintenance company, a roofing company, a call center to remotely service home computers, a lumber yard, etc.), and therefore, other graphical user interfaces may also be generated based on the other service or work environments. Moreover, the functionality described below with respect to the example graphical user interfaces may also be applicable to the other service or work environments.

Figure 8:
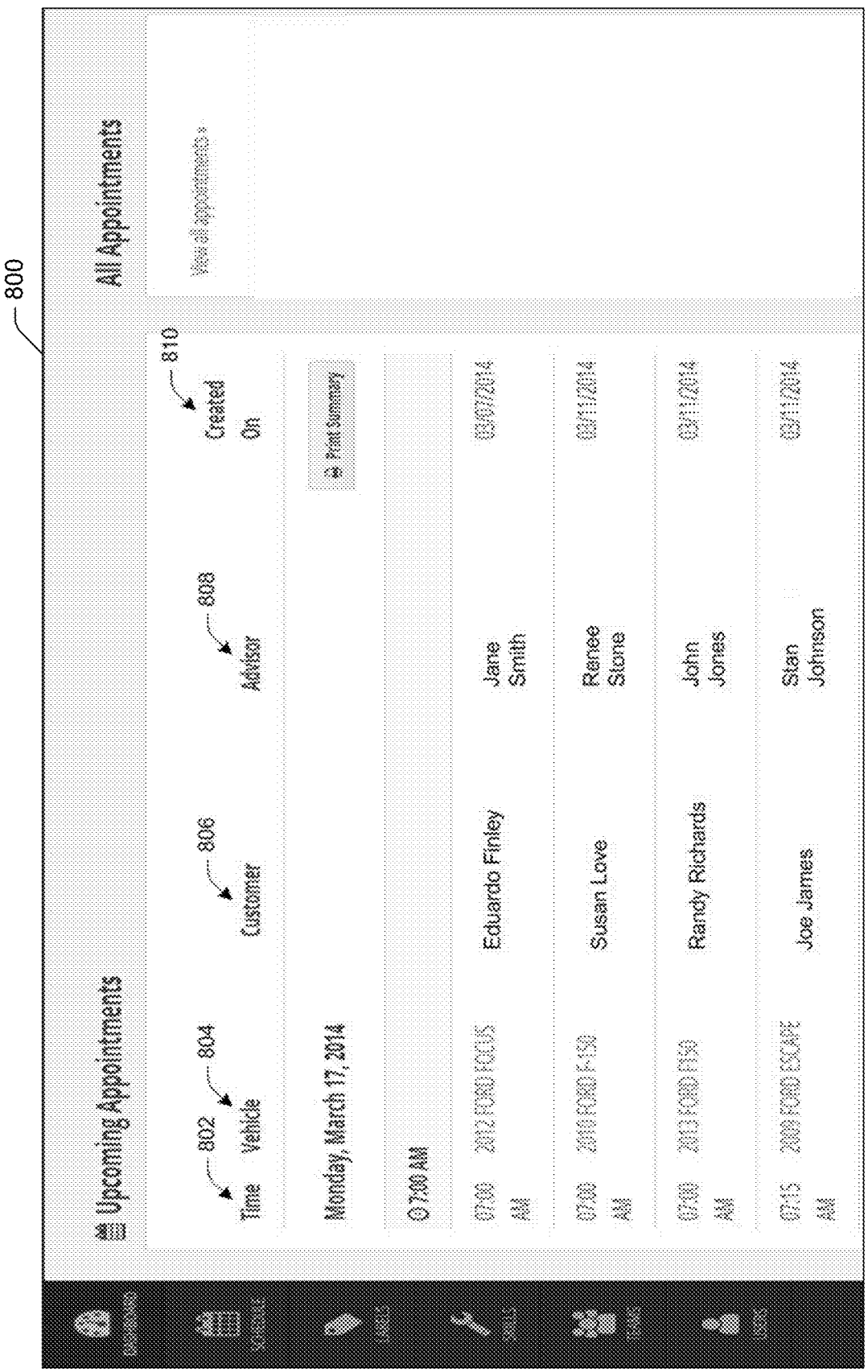
FIG. 8 illustrates an example graphical user interface directed to displaying a chronological order of appointment scheduled for a specified period of time, as described herein in accordance with various embodiments.

FIG. 8 illustrates an example graphical user interface (GUI) 800 directed to outputting a chronological order of appointments scheduled for a specified period of time. In various embodiments, the scheduling module 126 may be configured to output the GUI 800 based on the facility schedule generated for technicians working at the facility during the specified period of time. Thus, the scheduling module 126 is configured to sort the appointments for the facility or facilities based on a scheduled start time. The example GUI 800 may be associated with selection of the "dashboard" view as displayed in the menu of options on the left.

The example GUI 800 displays appointments for an individual facility for a specified date (e.g., Monday, Mar. 17, 2014). In some embodiments, the displayed appointments may be spread across multiple facilities. The appointments are listed in chronological order starting in the morning at 7:00 AM, and each appointment is associated with a time 802, a vehicle 804, a customer 806, an advisor 808 that wrote-up the work order (e.g., a scheduling representative), and the date the appointment was scheduled 810.

As shown, Eduardo Finley's 2012 Ford Focus is scheduled to be serviced at 7:00 AM and Jane Smith is the advisor that wrote up the work order, Susan Love's 2010 Ford F-150 is scheduled to be serviced at 7:00 AM and Renee Stone is the advisor that wrote up the work order, Randy Richards' 2013 Ford F-150 is scheduled to be serviced at 7:00 AM and John Jones is the advisor that wrote up the work order, and Joe James' 2009 Ford escape is scheduled to be serviced at 7:15 AM and Stan Johnson is the advisor that wrote up the work order.

Using the example GUI 800, a scheduling representative is provided with a view of the appointments scheduled for the day (e.g., the scheduling representative can scroll down) and can see the vehicles coming into an automobile maintenance and repair shop. Moreover, the scheduling representative can click on an individual appointment to view additional information (e.g., item information such as the primary concern, customer information, technician scheduled to work on the vehicle, etc.).

Figure 9:
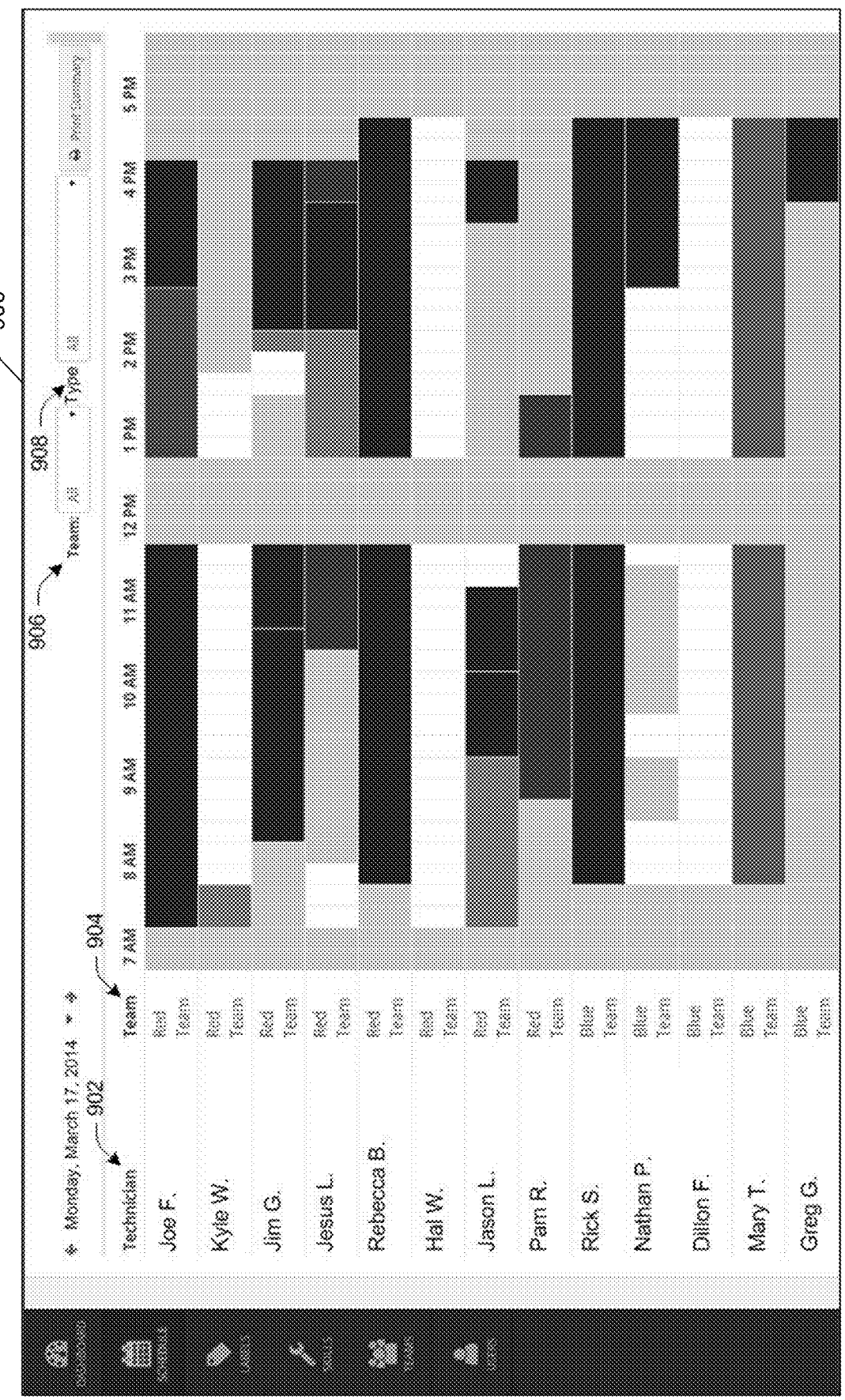
FIG. 9 illustrates an example user interface directed to displaying a facility schedule generated based on individual technician schedules, as described herein in accordance with various embodiments.

FIG. 9 illustrates an example GUI 900 directed to displaying a facility schedule generated based on individual technician schedules. In various embodiments, the scheduling module 126 may be configured to output the GUI 900 for technicians working at the facility during a specified period of time (e.g., Monday, Mar. 17, 2014). Thus, the scheduling module 126 is configured to access technician schedules and to aggregate the technician schedules so that an observer (e.g., a scheduling representative) can see how a facility is loaded for the specified period of time. The example GUI 900 may be associated with selection of the "schedule" view as displayed in the menu of options on the left. The example GUI 900, the technicians are sorted and/or listed based on team (e.g., Red Team, Blue Team). In alternative implementations, the scheduling module 126 may sort and/or list the technicians based on skills (e.g., 216(1) . . . 216(K)), skill level (e.g., 218(1) . . . 218(K)), or a combination of both.

In various embodiments, the scheduling module 126 visually distinguishes between reserved time slots (e.g., as shown by the shading in the example GUI). The visual distinctions may be based on colors, for example. In at least one embodiment, the scheduling module 126 visually distinguishes appointments based on a particular type of work or service. In at least one embodiment, the scheduling module 126 visually distinguishes appointments based on a particular job label. For example, in light of an unscheduled or unexpected availability resulting from a technician schedule update, the scheduling representative 202 may want to view appointments for jobs associated with a waiting customer label or an on premises label so a selected appointment can be re-scheduled to the unscheduled or unexpected available time slot.

As shown, the facility schedule lists technicians 902 (e.g., Joe F., Kyle W., Jim G., Jesus L., Rebecca B., Hal W., Jason L, Pam R., Rick S., Nathan P., Dillon F., Mary T., and Greg G.) and shows the different appointments currently scheduled for each technician for a specified period of time (e.g., Monday, Mar. 17, 2014 from 7:00 AM to 5:00 PM). In some implementations, the scheduling module 126 may sort the technicians based on a team 904 (e.g., Red Team, Blue Team, etc.), where a team may be defined based on technicians associated with, or assigned to, a particular scheduling representative 202 (e.g., an advisor) that writes up a work order. The scheduling representative or other observer of the example GUI 900 can view a duration of time estimated (e.g., 210(1) . . . 210(M)) to complete different appointments scheduled for various technicians. Moreover, the scheduling representative or other observer of the example GUI 900 can view time reserved for non-work or personal matters (e.g., lunch break). Even further, the scheduling representative or other observer can conveniently view unreserved time slots that are available to have a job assigned.

As discussed above, the facility schedule may be filtered based on a filtering instruction. In the example GUI 900, the filtering instruction may be based on input (e.g., a selection from a drop-down menu) of a particular team 906 and/or input (e.g., a selection from a drop-down menu) of a particular type 908 of work or service.

Figure 10:
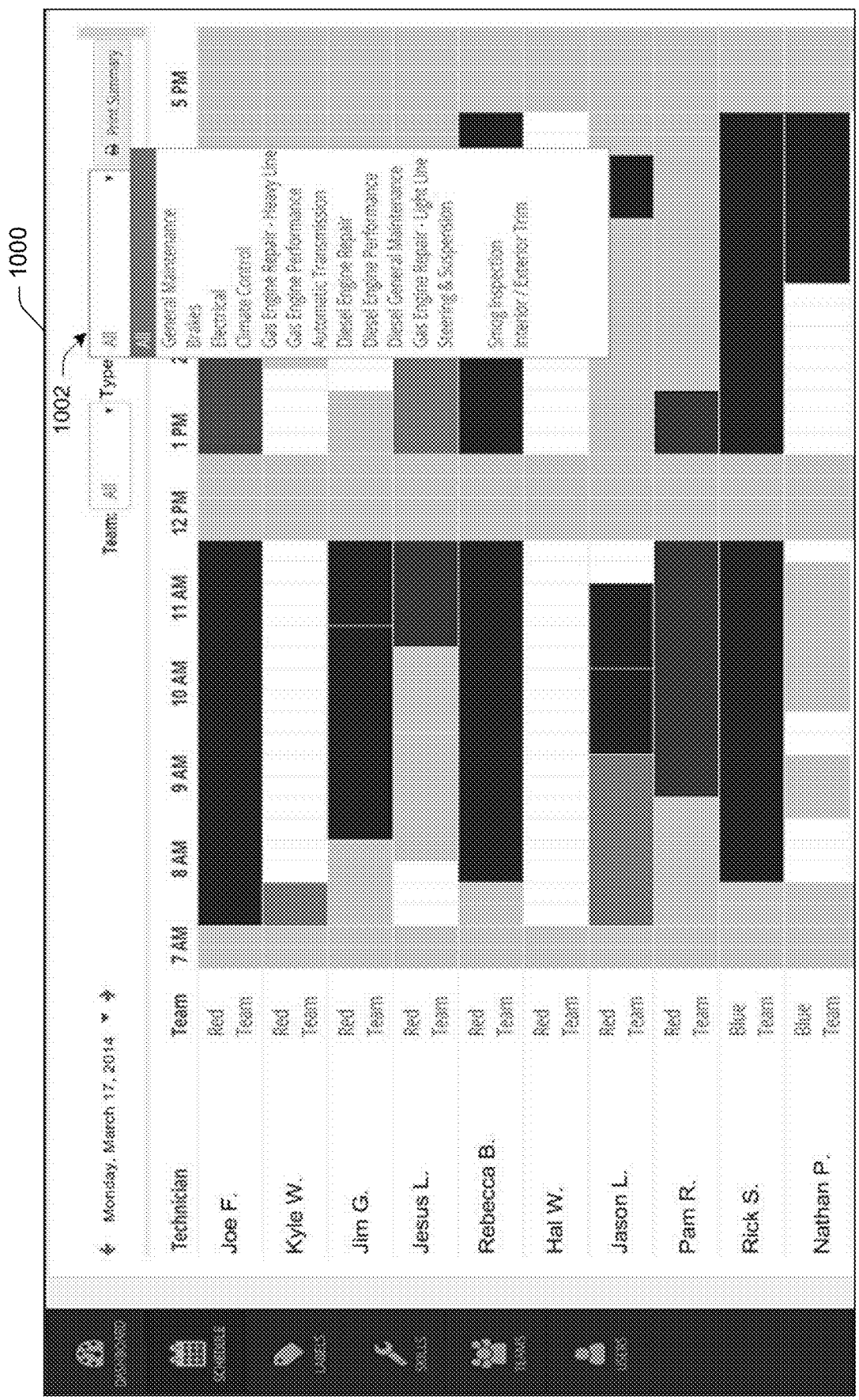
FIG. 10 illustrates an example user interface directed to receiving input indicative of a filtering instruction, as described herein in accordance with various embodiments.

FIG. 10 illustrates an example GUI 1000 directed to receiving input (e.g., a selection) indicative of a filtering instruction. As discussed above, the loading service 102 implements functionality that allows filtering of the facility schedule. The example GUI 1000 shows that a scheduling representative or other observer can select a type of work or service that serves as an instruction to filter the facility schedule. Thus, the example GUI 1000 displays a drop down menu 1002 of pre-defined types of service and a selection can be made from the listed menu (e.g., general maintenance, brakes, electrical, climate control, gas engine repair—heavy line, gas engine performance, automatic transmission, diesel engine repair, diesel engine performance, diesel general maintenance, gas engine repair—light line, steering & suspension, smog inspection, interior/exterior trim, etc.).

Figure 11:
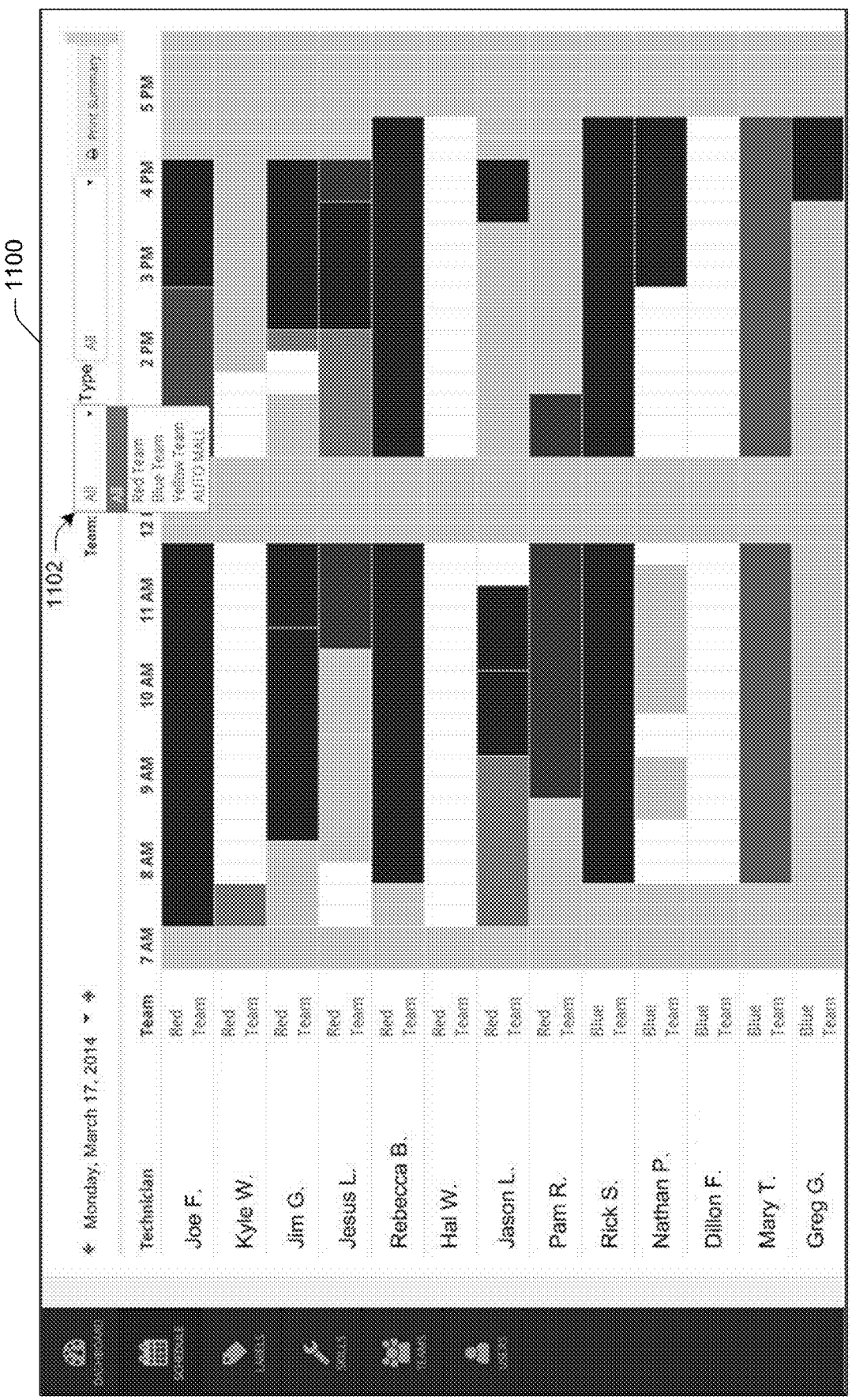
FIG. 11 illustrates an example user interface directed to receiving input indicative of another filtering instruction, as described herein in accordance with various embodiments.

FIG. 11 illustrates an example GUI 1100 directed to receiving input (e.g., a selection) indicative of another filtering instruction. The example GUI 1100 shows that a scheduling representative or other observer can select a team of technicians that serves as an instruction to filter the facility schedule. Thus, the example GUI 1100 displays a drop down menu 1102 of different teams and a selection can be made from the listed menu (e.g., Red Team, Blue Team, Yellow Team, Auto Mall Team, etc.). In some instances, the scheduling representative 202 want to view the schedules and/or the jobs to be performed by technicians that are part of their team and not other technicians that are part of another team.

Figure 12:
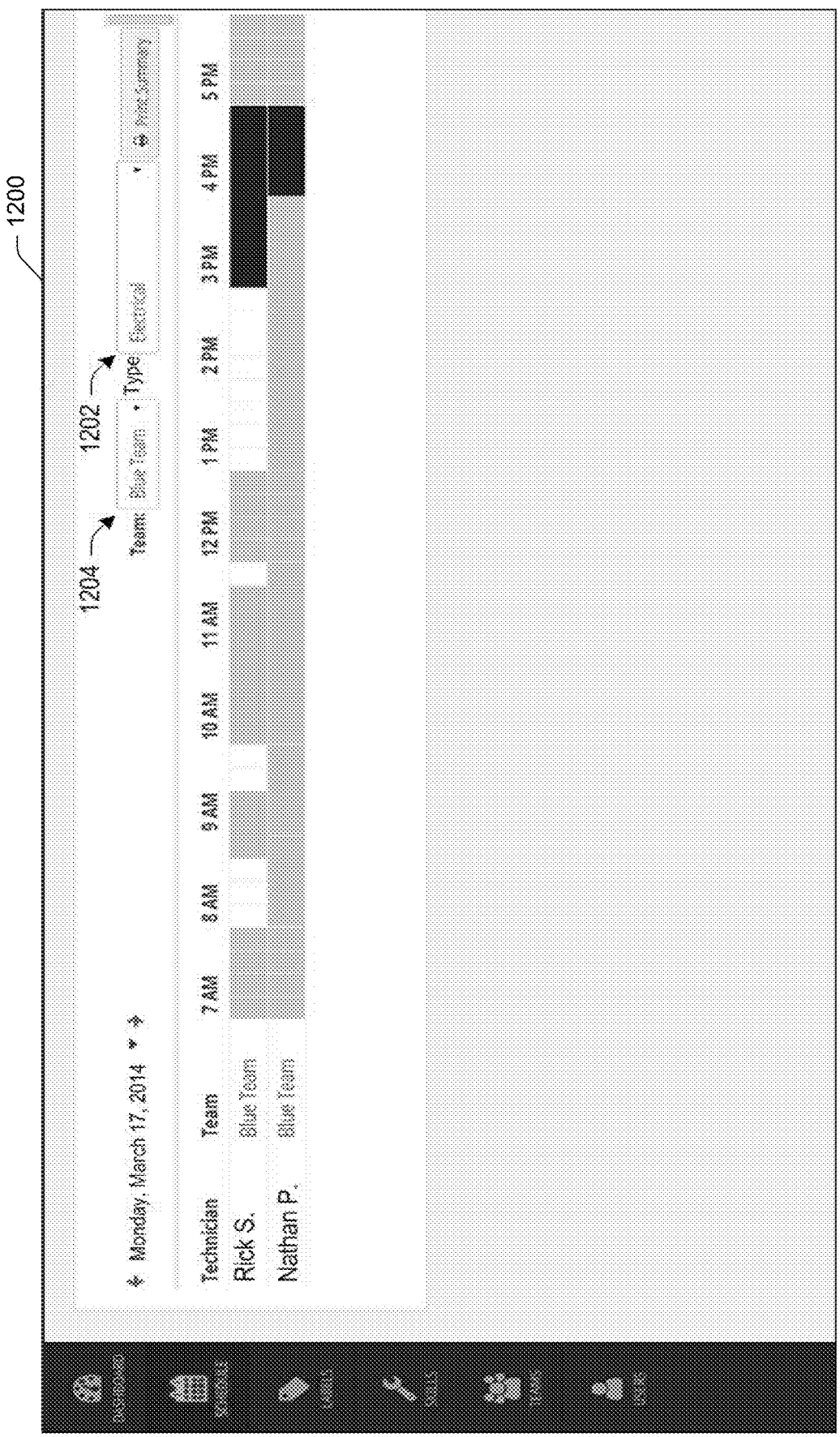
FIG. 12 illustrates an example graphical user interface directed to displaying a filtered facility schedule in response to one or more filtering instructions, as described herein in accordance with various embodiments.

FIG. 12 illustrates an example GUI 1200 directed to displaying a filtered facility schedule in response to one or more filtering instructions. The example GUI 1200 displays the filtered facility schedule based on selections made in accordance with the discussions of FIGS. 10 and 11. For instance, the example GUI shows that a type of service selection 1202 of "Electrical" was input and a team selection 1204 of "Blue Team" was also input. In response, the scheduling module 126 identifies technicians that have a skill indicating their ability (e.g., qualifications) to perform an "Electrical" service and that are also a member of the "Blue Team". As shown, the scheduling module 126 identifies technicians Rick S. and Nathan P. based on the filtering instructions and then displays the filtered facility schedule so the scheduling representative can view the filtered information requested. As discussed above, the facility schedule may be filtered based on other information as well.

Figure 13:
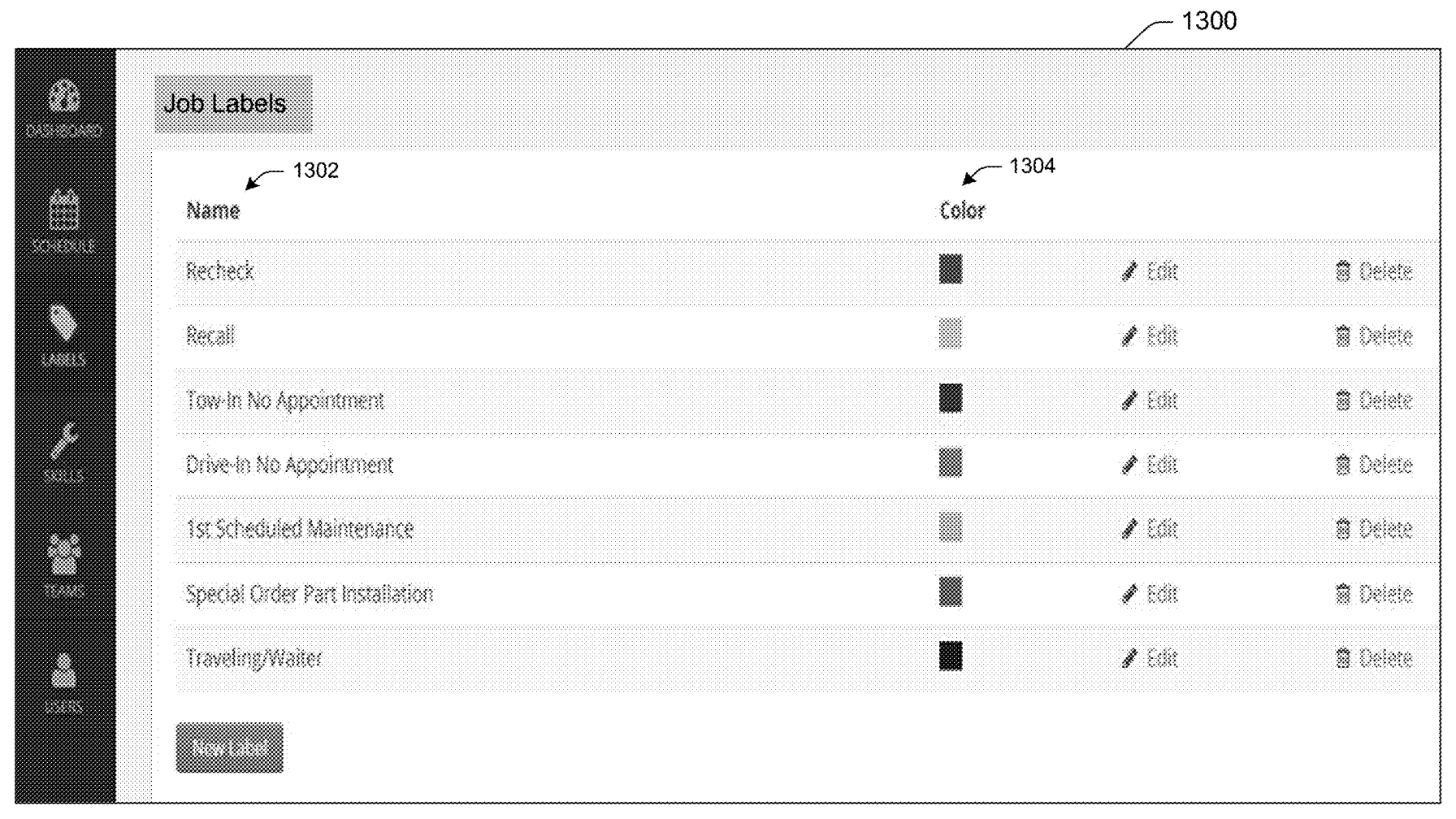

FIG. 13 illustrates an example GUI 1300 directed to defining different job labels. The example GUI 1300 displays settings to define a job label (e.g., a label name 1302) and/or assign the job label a distinctive color 1304. As discussed above, example job labels may include a recheck, a recall, an on premises tow-in no appointment (i.e., no appointment here relates to no appointment scheduled in advance by the customer), an on premises drive-in no appointment (i.e., no appointment here relates to no appointment scheduled in advance by the customer), a first scheduled maintenance, a special order part installation, and/or a traveling/waiter (e.g., a customer waiting at the facility). The color may be used to distinguish scheduled appointments with particular labels so that a scheduling representative or technician can conveniently locate appointments during a scheduling or re-scheduling process. As discussed above, an individual job may be associated with more than one label (e.g., an on premises tow-in no appointment and a traveling/waiter).

The example GUI 1300 may be associated with selection of the "labels" view as displayed in the menu of options on the left.

Figure 14:
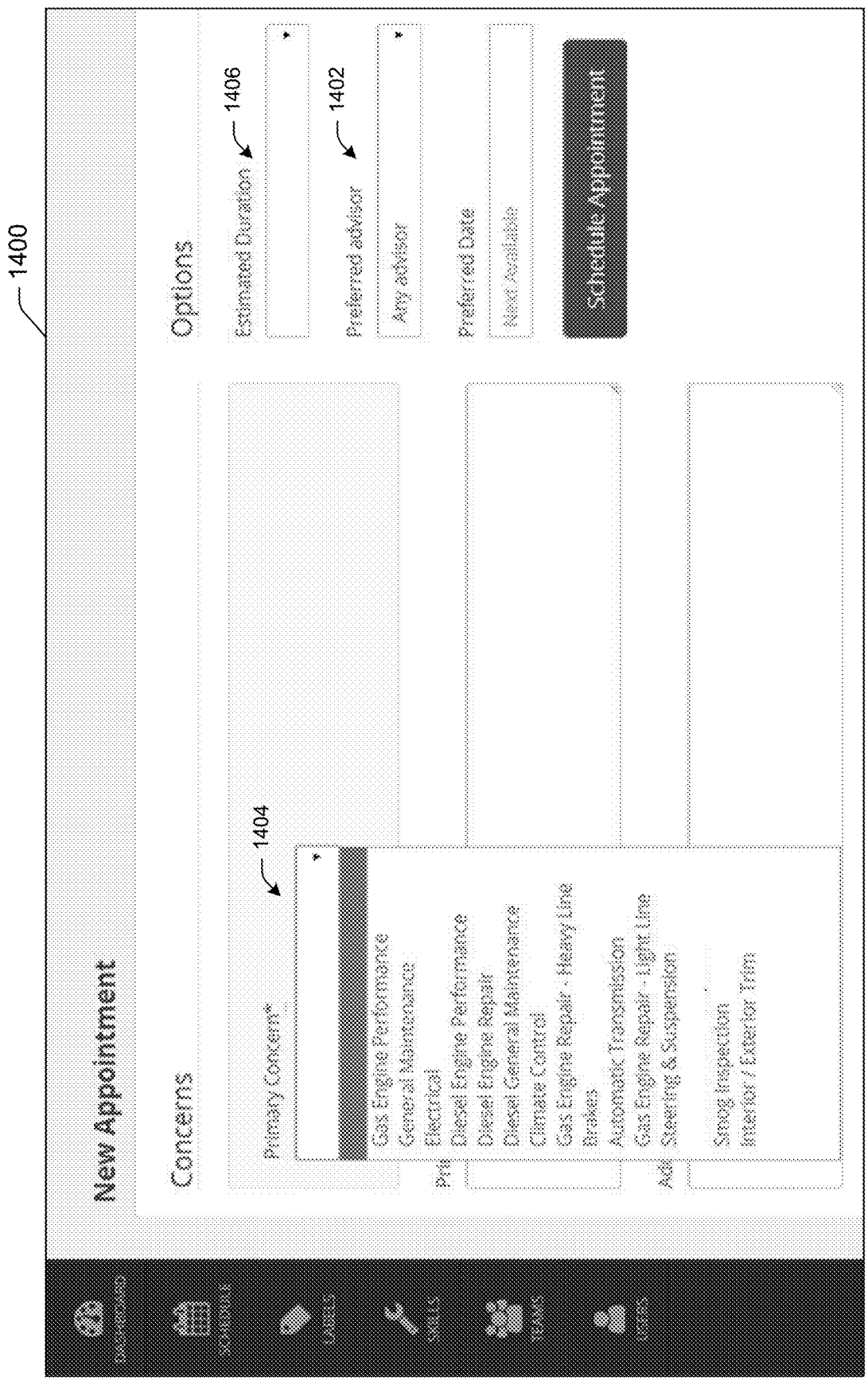
FIG. 14 illustrates an example graphical user interface directed to determining initial item information for a new job to be scheduled, as described herein in accordance with various embodiments.

FIG. 14 illustrates an example GUI 1400 directed to determining initial item information for a new job to be scheduled. The example GUI 1400 displays windows where information about an item 112 to be serviced can be entered (e.g., by scheduling representative 202 or customer 110). For instance, the example GUI 1400 displays an entry window 1402 that receives input (e.g., a selection) directed to identifying an advisor (e.g., the advisor creating a work order for the new job to be scheduled). Entry window 1402 allows the scheduling representative to provide an instruction for the scheduling module 126 to locate and output available time slots for (i) the scheduling representative's own team of technicians (e.g., if a particular advisor is selected via entry window 1402) or (ii) for any technician at one or more facilities that may be part of other scheduling representatives' teams (e.g., if "any advisor" is specified via entry window 1402).

The example GUI 1400 further displays an entry window 1404 that receives input directed to determining a type of work or service (shown in FIG. 14 as a "primary concern") to be performed on an item. As discussed above, the different types may be pre-defined or pre-determined by the facility. In the example GUI 1400, the types are selectable via a drop-down menu and include: a gas engine performance service type, a general maintenance service type, an electrical service type, a diesel engine performance service type, a diesel engine repair service type, a diesel general maintenance service type, a climate control service type, a gas engine repair—heavy line service type, a brakes service type, an automatic transmission service type, a gas engine repair—light line service type, a steering and suspension service type, a smog inspection service type, and an interior/exterior trim service type. As discussed above, input may be provided, and a selection made, by the scheduling representative 204 based on information communicated from a customer to the scheduling representative (e.g., verbal face-to-face communication or voice communication via a phone call). Entry window 1406 displays the estimated duration of time to complete (e.g., 208(1) . . . 208(M)) a job correlated to, or associated with, the particular service or work type determined via entry window 1404.

FIG. 15 illustrates an example GUI 1500 directed to determining a service or work type and an estimated duration of time to complete a new job. For instance, the example GUI 1500 shows that an "electrical" service type 1502 is determined for the new job. The determination may be based on a user-selection or the scheduling module 126 may automatically determine the service or work type based on information (e.g., keywords) provided or entered via a primary concern window 1504 and/or additional concerns and requests window 1506.

Moreover, the example GUI 1500 shows that the estimated duration of time to complete a job of an electrical service type is one hour 1508. In various embodiments, the scheduling module 126 automatically determines the estimated duration of time to complete a job based on a mapping that associates the duration with a determined type (e.g., the electrical service type is mapped to one hour via a table maintained by the loading service 102). In some instances, the scheduling module 126 is configured to receive input that overrides or adjusts the pre-defined or default duration of time to complete a job. For example, based on an analysis of the explanation of description of the customer primary concern and additional requests (e.g., potential additional issues with the item to check), a scheduling representative may determine that a job may likely take a longer duration of time than the default estimated duration of time or a shorter duration of time than the default estimated duration of time, and thus, the scheduling representative can provide input to adjust the estimated duration 1508 (e.g., change the one hour to one hour and thirty minutes).

After a type of service or work and an estimated duration of time to complete are determined, the scheduling representative or the customer may select an option 1510 directed to scheduling an appointment. In the example GUI 1500, the option 1510 is selected when an entry window 1512 specifies that the scheduling representative or the customer would like to view the next available time slots to have an item serviced or worked on. The next available time slots may be one or more earliest, or best, available time slots which may be the current time, one hour from the current time, four hours from the current time, the next day, the next week.

Figure 16:
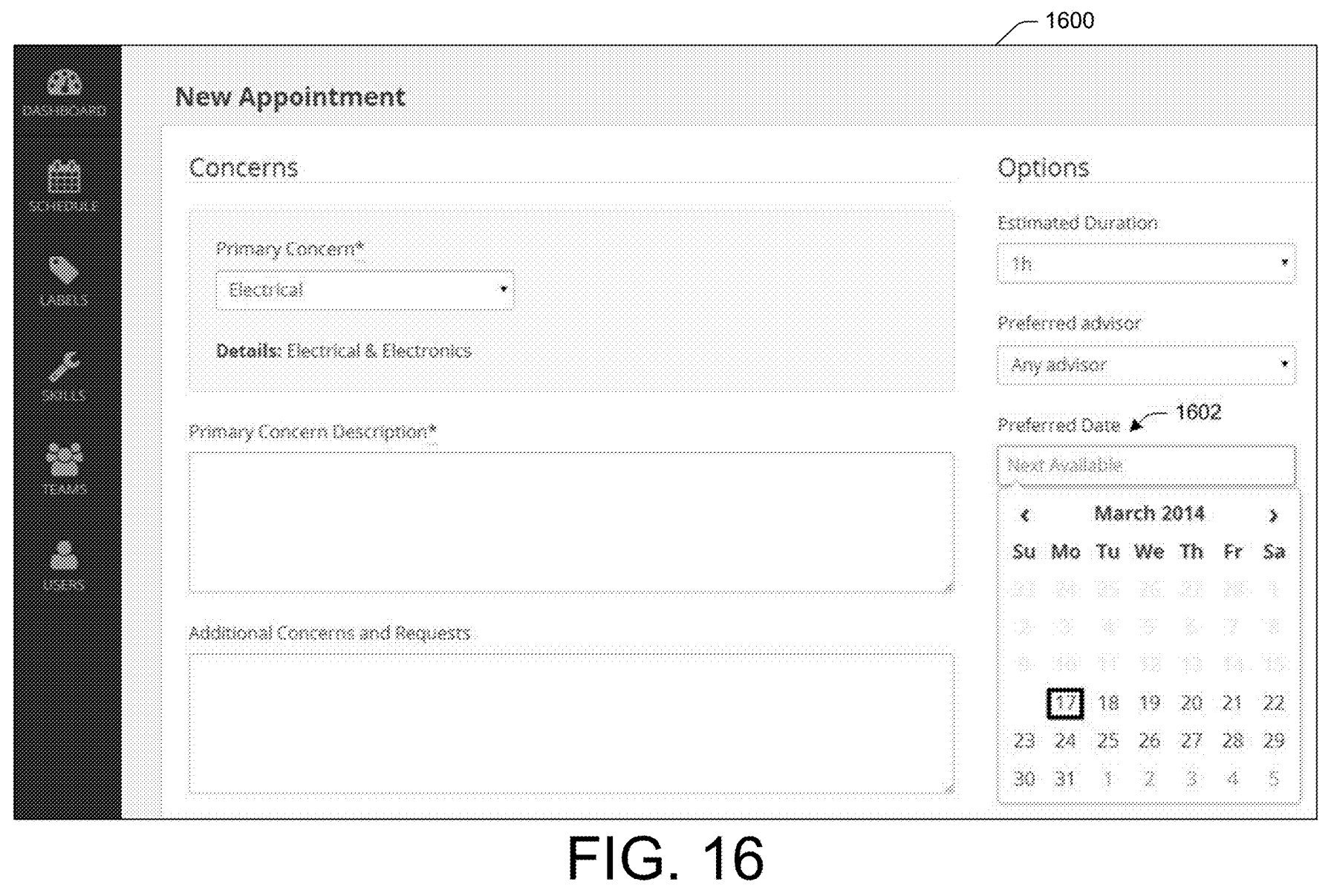

FIG. 16 illustrates an example GUI 1600 directed to determining a period of time to schedule an appointment for a new job. In contrast to the next available time slot instruction discussed above with respect to the example GUI 1500, the example GUI 1600 shows that the scheduling representative or the customer has accessed the entry window 1512 to select or input a specific date 1602 (e.g., Monday, Mar. 17, 2014) that the customer would like to have an item serviced. Thus, the entry window 1512 allows the scheduling representative or the customer to access technician schedules for the whole week, the next week, the rest of the month, the next month, etc. In various embodiments, a selection via the entry window 1512 may correspond to a specific date. In other embodiments, a selection via the entry window may correspond to parts of a date (e.g., a morning service session or an afternoon service session) or a range of dates (e.g., Mar. 17-21, 2014). Thus, instead of finding and outputting the next available time slots discussed above with respect to example GUI 1500, the scheduling representative or the customer view available time slots based on a specified time period associated with customer plans to bring the item in and have it serviced.

Figure 17:
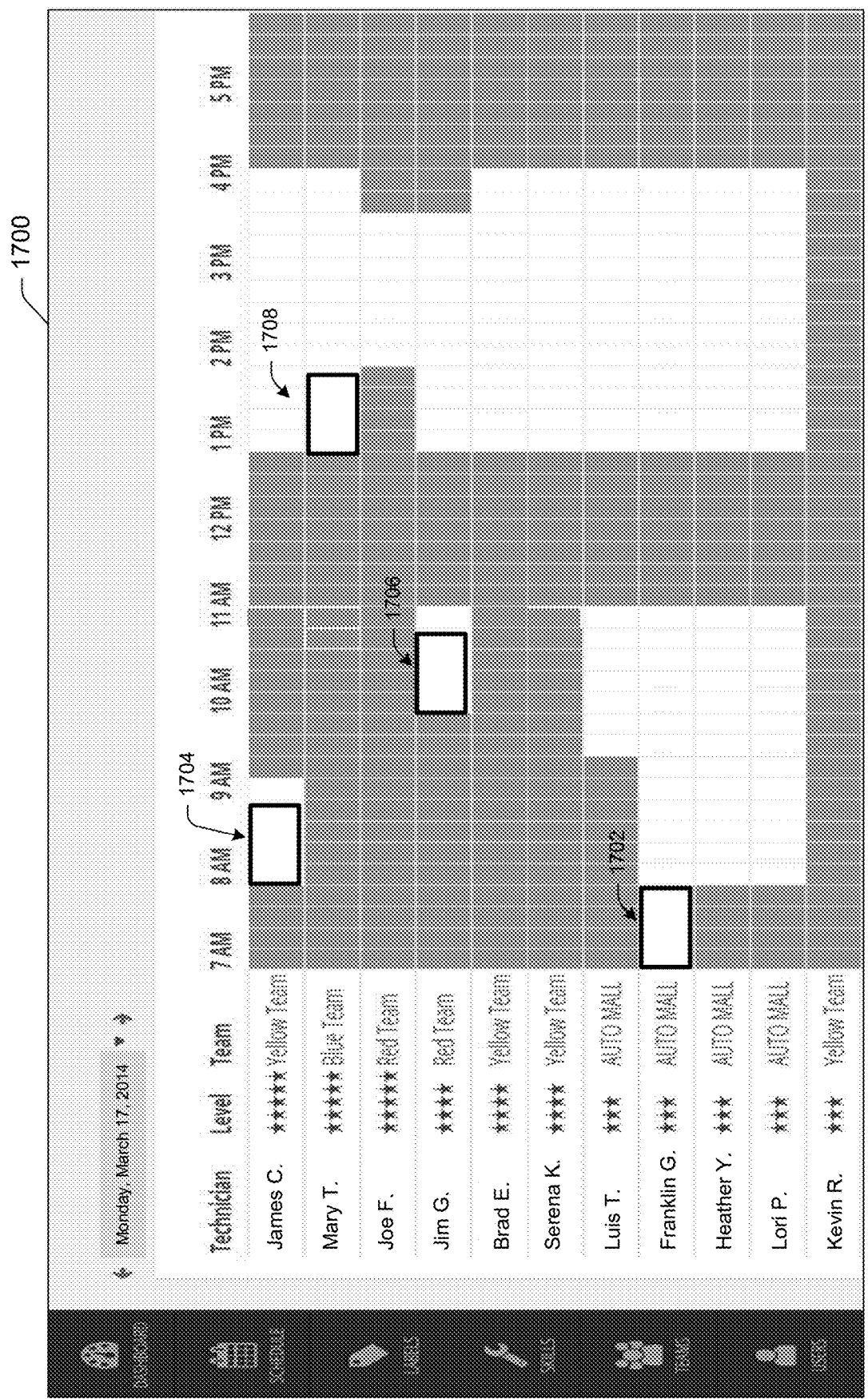
FIG. 17 illustrates an example graphical user interface directed to displaying time slots available to schedule an appointment for a new job, as described herein in accordance with various embodiments.

FIG. 17 illustrates an example GUI 1700 directed to displaying time slots available to schedule an appointment for a new job. The example GUI 1700 is based on a selection made via entry window 1512. For example, if the selection indicated that the scheduling representative or customer would like to view the next available time slots (e.g., the earliest available time slots), then Mar. 17, 2014 would be the date with the earliest availability for an appointment to be scheduled for a job. Or the selection may have indicated that the scheduling representative or customer would like to view available time slots for a specified time period (e.g., Mar. 17, 2014).

The example GUI 1700 distinguishes between time already reserved for work appointments or personal matters (e.g., the shaded time slots) and time slots that are available and open within the technician schedules to have a new appointment scheduled (e.g., the white or lighter time slots). Thus, the scheduling representative is provided with a visual indication of the balance, or imbalance, of work-load amongst technicians, and the scheduling representative can schedule a new job after considering (e.g., conveniently viewing) the balance or imbalance of the work-load. The example GUI 1700 partitions the schedules into fifteen minute increments (e.g., each box in an individual schedule represents fifteen minutes of time), but other increments may be used as well (e.g., each box represents ten minutes, thirty minutes, one hour, etc.).

As discussed above, in response to the input provided via the example GUIs in any one of FIGS. 14-16, the scheduling module 126 may identify technicians that have skills indicating appropriate training and qualifications to perform an electrical service type. Thus, the technicians whose scheduled are displayed in the example GUI 1700 are technicians capable of servicing an electrical issue with an automobile. Moreover, in various embodiments, the scheduling module 126 is configured to ensure that available time slots are large enough to accommodate the estimated duration of time to complete (e.g., one hour for an electrical service type). Thus, the scheduling module 126 may not indicate that an isolated single box (e.g., fifteen minutes) of unreserved technician time surrounded by two reserved appointments is available for a job of the electrical service type. Rather, the scheduling module 126 may ensure that at least four consecutive boxes (e.g., at least one hour) are unreserved, and therefore, available.

In various embodiments, the scheduling module 126 may output one or more suggested or recommended time slots. The scheduling module 126 may also provide an explanation or description for the suggested or recommended time slots. For example, recommended time slot 1702 is the earliest available time slot (e.g., 7:00 AM appointment with Franklin G.). As discussed above, a suggested or recommend time slot may be based on a job label. Thus, recommended time slot 1704 may specify a time slot with a more experienced technician (e.g., James C. has a five out of five star technician skill level). In another example, recommended time slot 1706 may specify a time slot for a "re-check", and Jim G. may have been the technician to previously service the automobile. In yet another example, recommended time slot 1708 may be recommended in accordance with an even distribution policy (e.g., for a recall label) because technician Mary T. may be the next technician identified to receive a job with a recall label.

As shown in example GUI 1700, the technicians may be sorted based on skill level (e.g., star level or rating). In various embodiments, the example GUI 1700 may display available time slots for a single facility (e.g., the listed technicians work at the same facility). In alternative embodiments, the example GUI 1700 may display available time slots for multiple facilities (e.g., the listed technicians work at two or more facilities). In some embodiments, the scheduling module 126 may be able to output available time slots at a first facility (e.g., a customer preferred facility) but may also be able to display (e.g., concurrently display) available time slots at a second facility. For example, if the first facility currently has a long estimated wait, the scheduling module 126 may suggest or recommend that the scheduling representative consider, and inform the customer of, time slots at a second facility that may have a shorter estimated wait. The display of available time slots may be based on geographical information (e.g., facilities located in the same zip code or in the same city) or a threshold distance (e.g., a facility within a threshold distance from a customer location or the location of the first facility).

In various embodiments, a scheduling representative can limit the available time slots displayed to technicians that are part of the scheduling representative's own team. Thus, instead of displaying technicians that are part of the Yellow Team, the Blue Team, the Red Team and the Auto Mall Team, the example GUI 1700 may limit the display to one team associated with the advisor selected via entry window 1402.

Further, the scheduling representative may navigate to the next day or the previous day via selection of an arrow adjacent to the listed date (e.g., Monday, Mar. 17, 2014).

Figure 18:
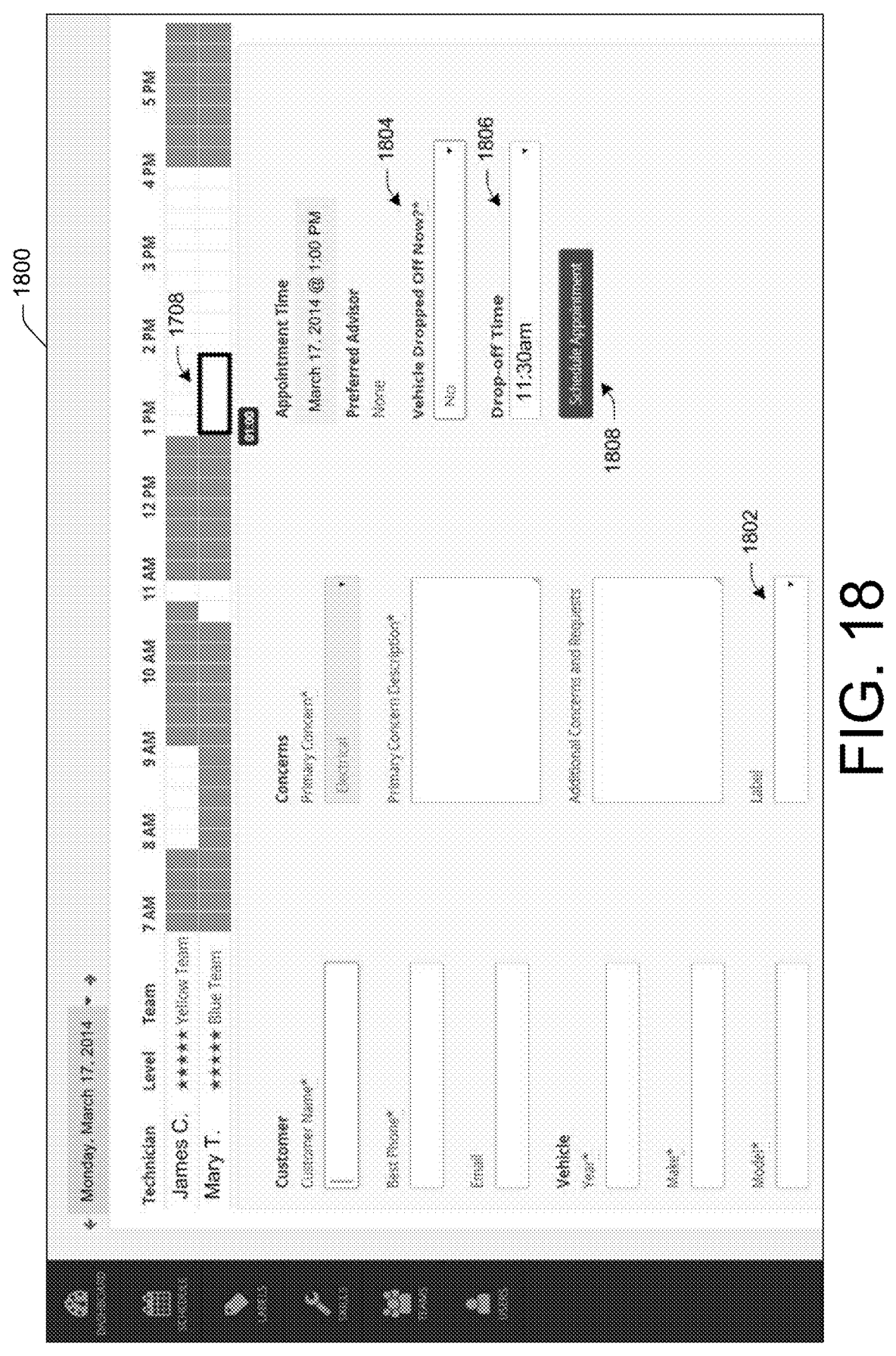

FIG. 18 illustrates an example GUI 1800 directed to receiving customer information and item information. The example GUI 1800 may be displayed in response to selection of an available time slot. For instance, the scheduling representative may have selected available time slot 1708 in example GUI 1700. Thus, the scheduling representative is scheduling an appointment for the new job with technician Mary T. Upon selection of an available time slot, the example GUI 1800 allows the scheduling representative to input customer information (e.g., name, phone number, email, etc.) and/or additional information about the item (e.g., a vehicle year, vehicle make, vehicle model, etc.). It is understood that other item information and customer information may be entered as well. Moreover, if a job label was not entered or determined in association with any one of FIGS. 14-16, the example GUI 1800 provides an entry window 1802 for a job label to be specified.

Additionally, the example GUI 1800 allows the scheduling representative to specify, via entry window 1804, whether an item is being dropped off at the time the appointment is scheduled (e.g., the customer arrived at the facility to request the scheduling the appointment). If the item is not being dropped off at the time the appointment is scheduled, the example GUI allows the scheduling representative to specify, via entry window 1806, a drop-off time. In various embodiments, a job label indicating that an item is on the premises may be determined from the information provided via entry window 1804 and entry window 1806.

Finally, the scheduling of the appointment may be confirmed and entered into the technician schedule (e.g., reserve time in Mary T.'s schedule) and the facility scheduled via selection of option 1808.

Figure 19:
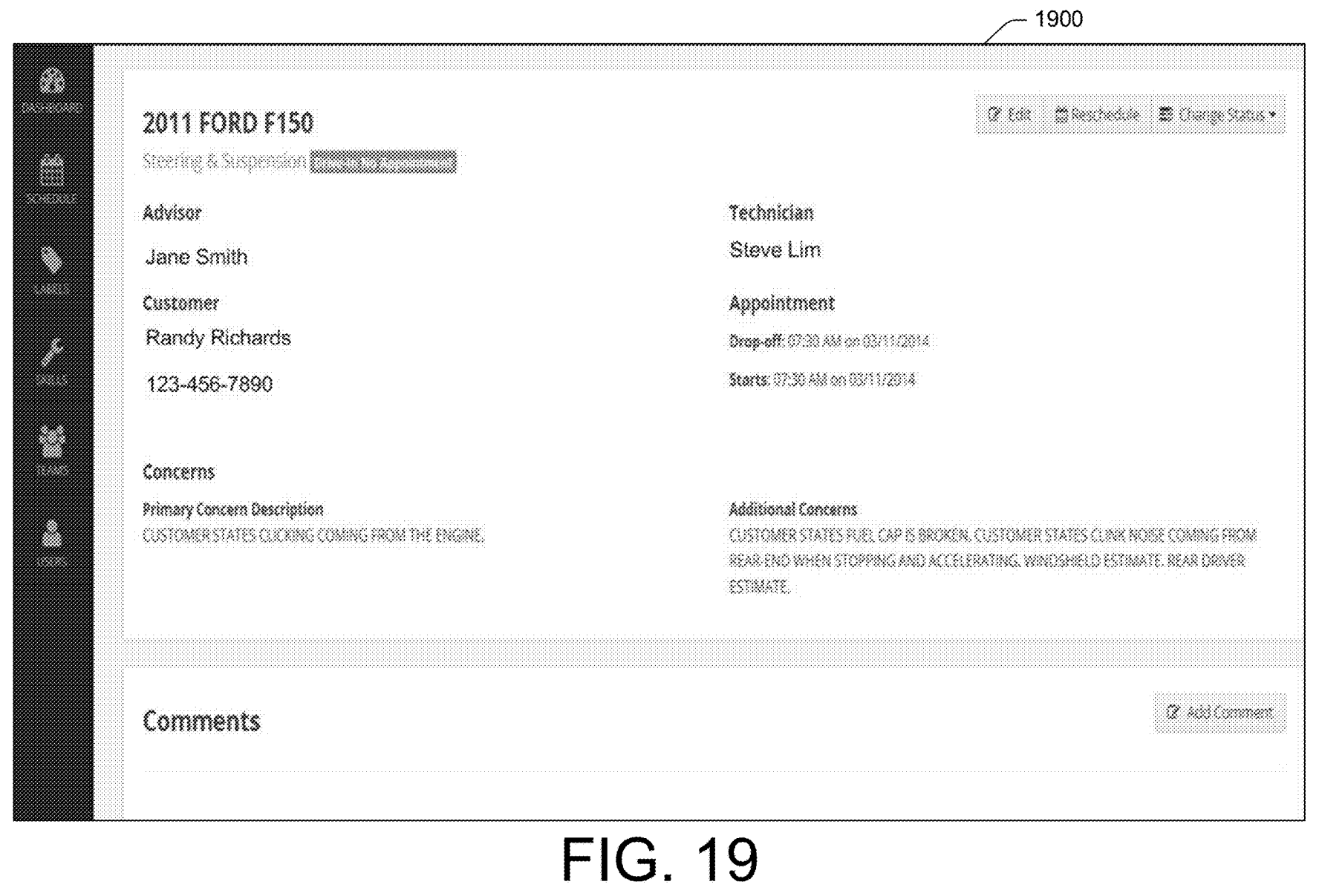

FIG. 19 illustrates an example GUI 1900 directed to viewing information associated with a job. For example, the example GUI 1900 may be accessed by selecting (e.g., clicking on) an appointment displayed via any one of the example GUIs in FIGS. 8-12. Thus, the example GUI 1900 may display the item being serviced (e.g., a 2011 Ford F150), the type of service (e.g., steering and suspension), job labels (e.g., drive-in no appointment indicating the item is on the premises), the advisor who wrote up the work order (e.g., Jane Smith), the technician scheduled to perform the service (e.g., Steve Lim), the scheduled appointment time, the customer information, and the customer concerns.

In various embodiments, the loading service 102 may be configured to maintain a job log to track and record any changes to a job. For example, each change to the job information (e.g., a revision to the scheduled appointment time) may include a time and date stamp as well as an indication of who or what implemented the change (e.g., a technician ID, an advisor ID, an automatic re-scheduling by the loading service, etc.). Thus, any person who opens and views the job information (e.g., via example GUI 1900) may be able to see the job log and see who made any changes.

Figure 20:
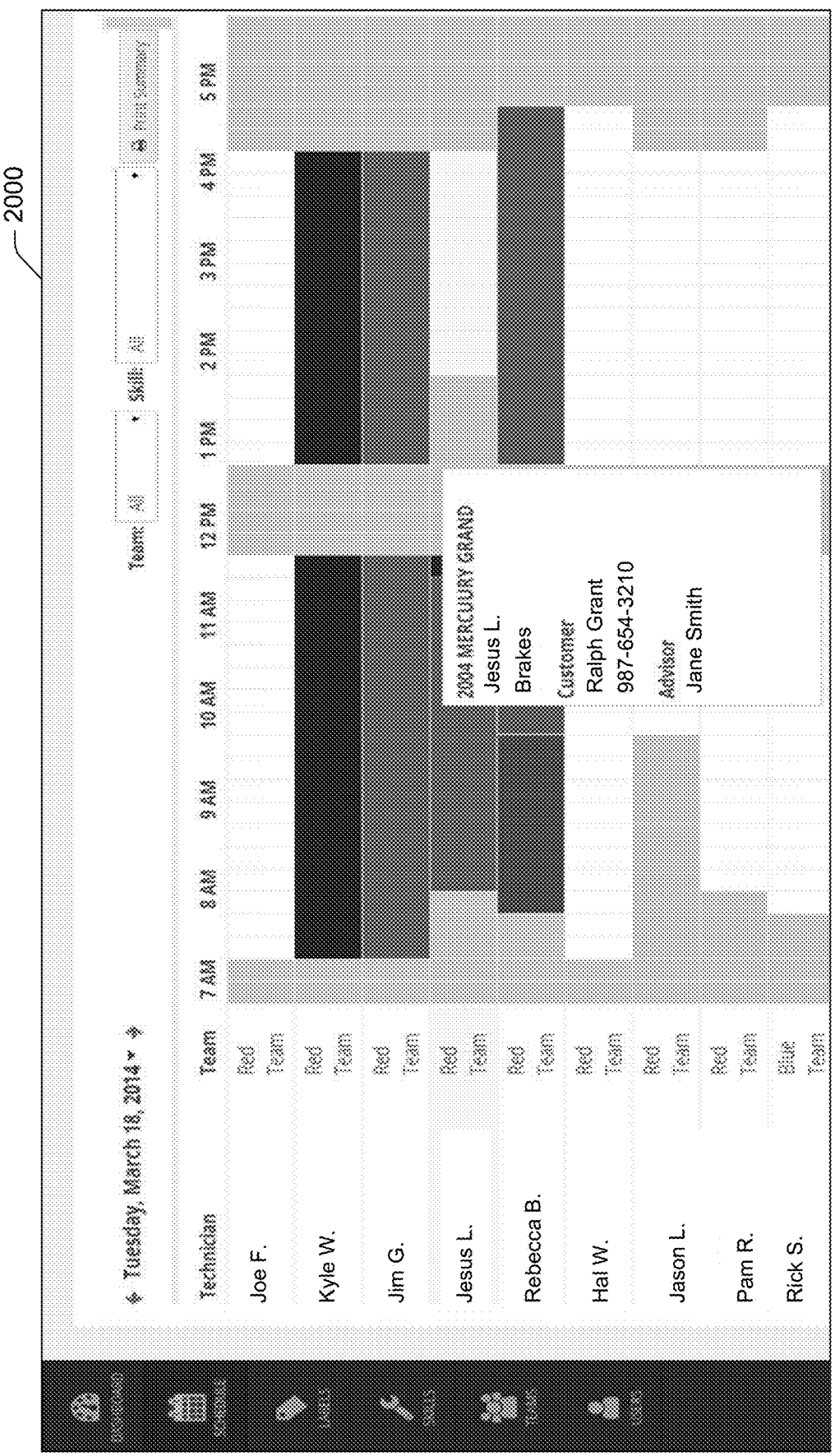
FIG. 20 illustrates an example graphical user interface directed to displaying job information based on a screen location of an input device, as described herein in accordance with various embodiments.

FIG. 20 illustrates an example GUI 2000 directed to displaying job information based on a screen location of an input device. For example, the example GUI 2000 may display a summary of the job information (e.g., a 2004 Mercury Grand, the technician Jesus L., a brakes service type, the customer Ralph Grant, the advisor Jane Smith, etc.) in response to a cursor hovering over the scheduled appointment in Jesus L.'s schedule.

Figure 21:
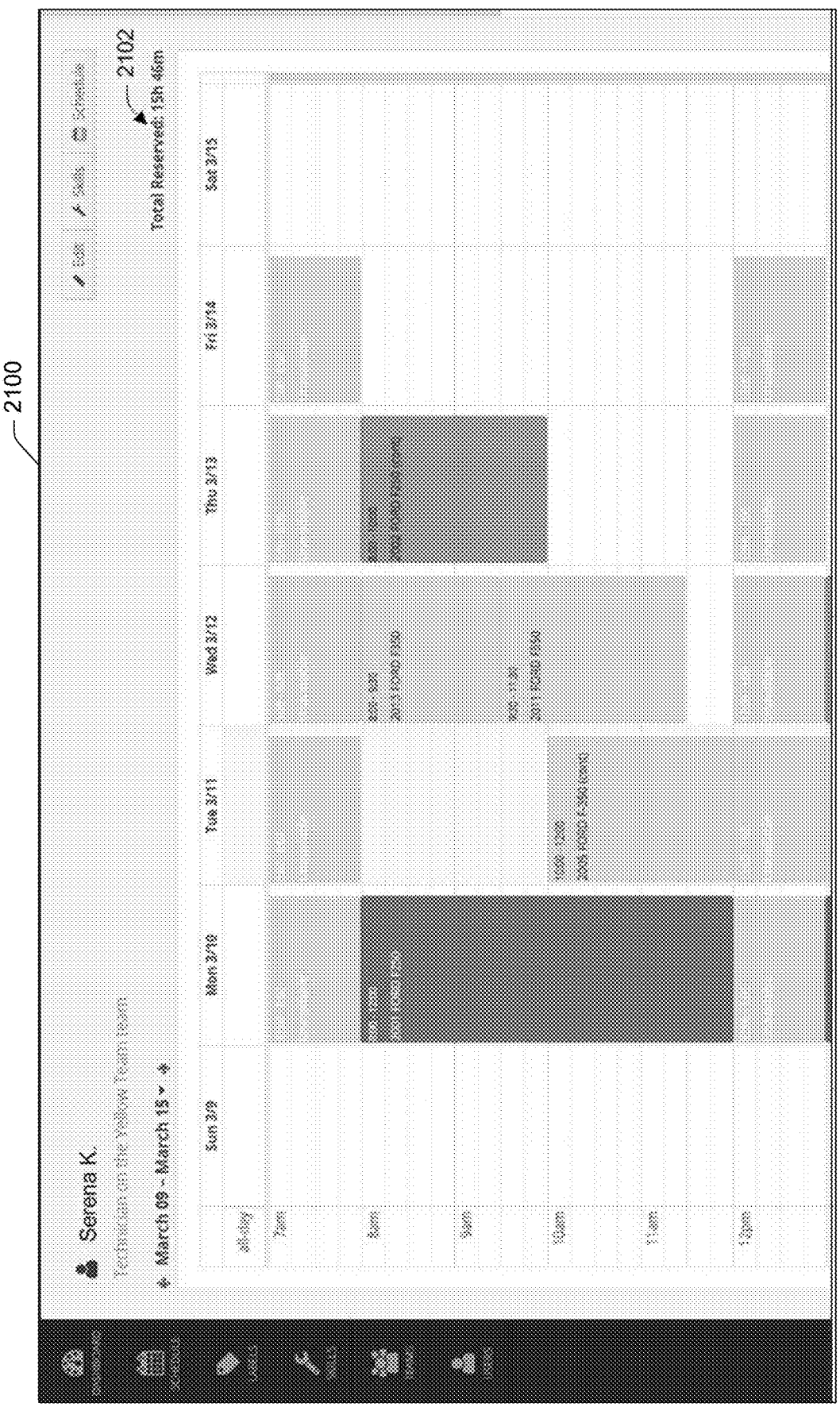
FIG. 21 illustrates an example graphical user interface directed to displaying a technician schedule, as described herein in accordance with various embodiments.

FIG. 21 illustrates an example GUI 2100 directed to a technician schedule. For example, the example GUI 2100 displays technician Serena K.'s weekly schedule. Serena K.'s schedule may be displayed on an entity device 104 in response to an instruction from a scheduling representative. Or the technician schedule may be displayed at a work station device 116 for a technician to view and make a technician revision for a current appointment or future appointment. In addition to displaying individual appointments, the example GUI 2100 displays a total amount of time reserved 2102 for work appointments. The scheduling module 126 is configured to determine the total amount of time reserved 2102 for work appointments by adding up the reserved time in the technician scheduled for a given period of time (e.g., a week, a month, an unbounded amount of time, etc.).

Figure 22:
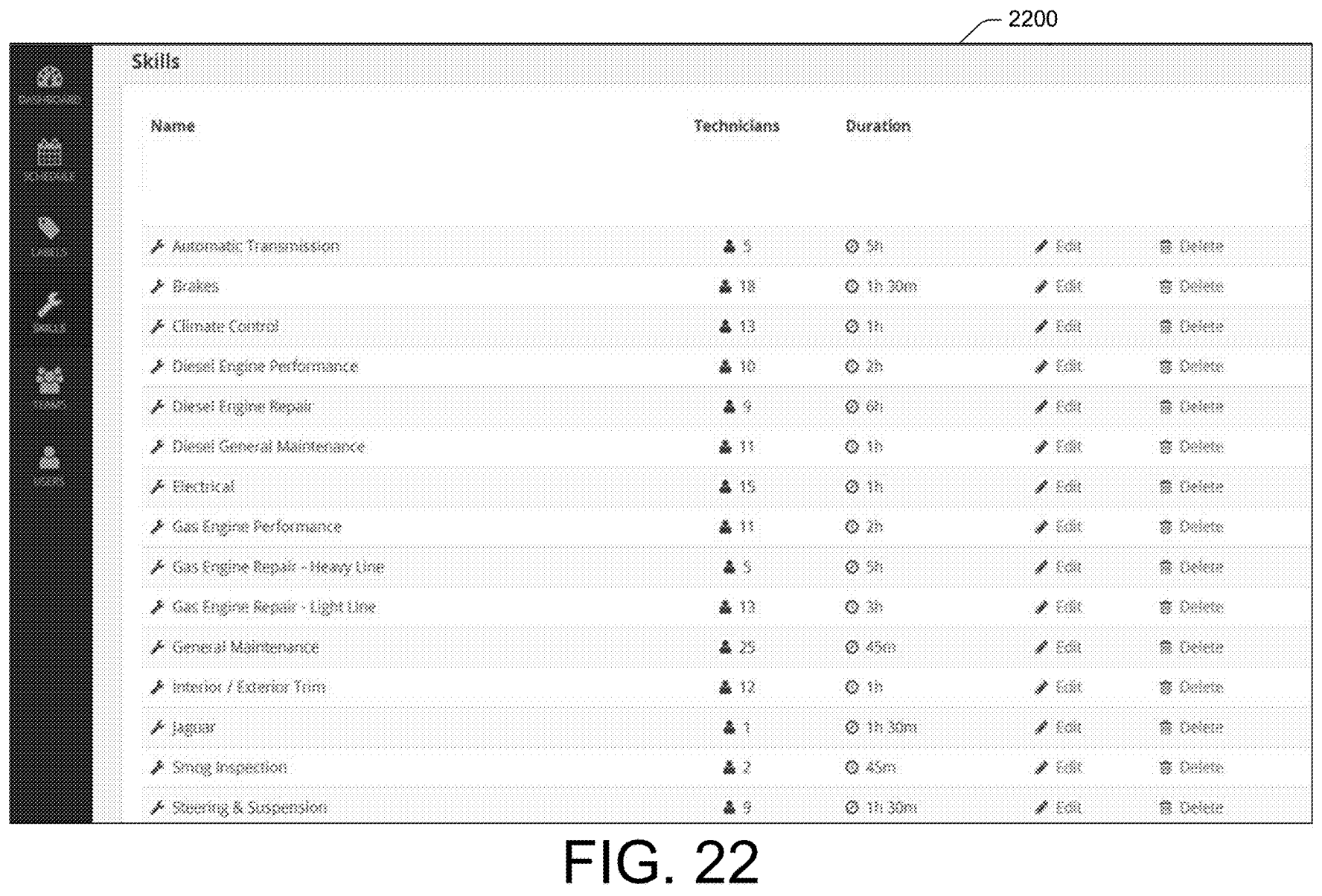

FIG. 22 illustrates an example GUI 2200 directed to defining types of work or service and an estimated duration of time to complete a job of a particular type. Accordingly, the example GUI 2200 displays service types for an automobile maintenance and repair shop as discussed above. Additionally, example GUI 2200 may display a number of technicians staffed by an entity to perform the various types of service.

FIG. 23 illustrates an example GUI, or part of an example GUI, directed to determining and displaying a total amount of technician time reserved for work appointments. As discussed above, the scheduling module 126 is configured to access technician schedules and to add up a total amount of time reserved for work-related appointments. The total amount of time may be added up for a given period of time (e.g., a day, two days, a week, a month). This allows advisors to see an indication of whether incoming work for the shop is balanced across technicians. The scheduling module 126 may list the technicians based on a rank where the technicians with a higher rank have more scheduled work. In the example GUI 2300, the scheduling module output technicians with a lower rank on top so a scheduling representative can conveniently see the technicians that do not have as much work scheduled, e.g., for a specified period of time (e.g., the scheduling representative can view a quantitative indication of a work-load imbalance). For instance, Jim G. may only have two hours and thirty minutes reserved for an eight hour work day while Jason L. has ten hours reserved for the eight hour work day. In various embodiments, the technicians listed in FIG. 23 may be technicians that are part of a particular team (e.g., associated with an advisor) and/or technicians that have the same technician skills and perform the same type of service or work. The scheduling module 126 may also be configured to provide visual indicators (e.g., highlight Jim G.'s name in a green color to indicate he needs work assigned for the day and highlight Jason L.'s name in a red color to indicate he is already over-booked for the day).

The scheduling module 126 may display the information in FIG. 23 as supplemental information in any one of the example GUIs presented in FIGS. 8-22

Figure 24:
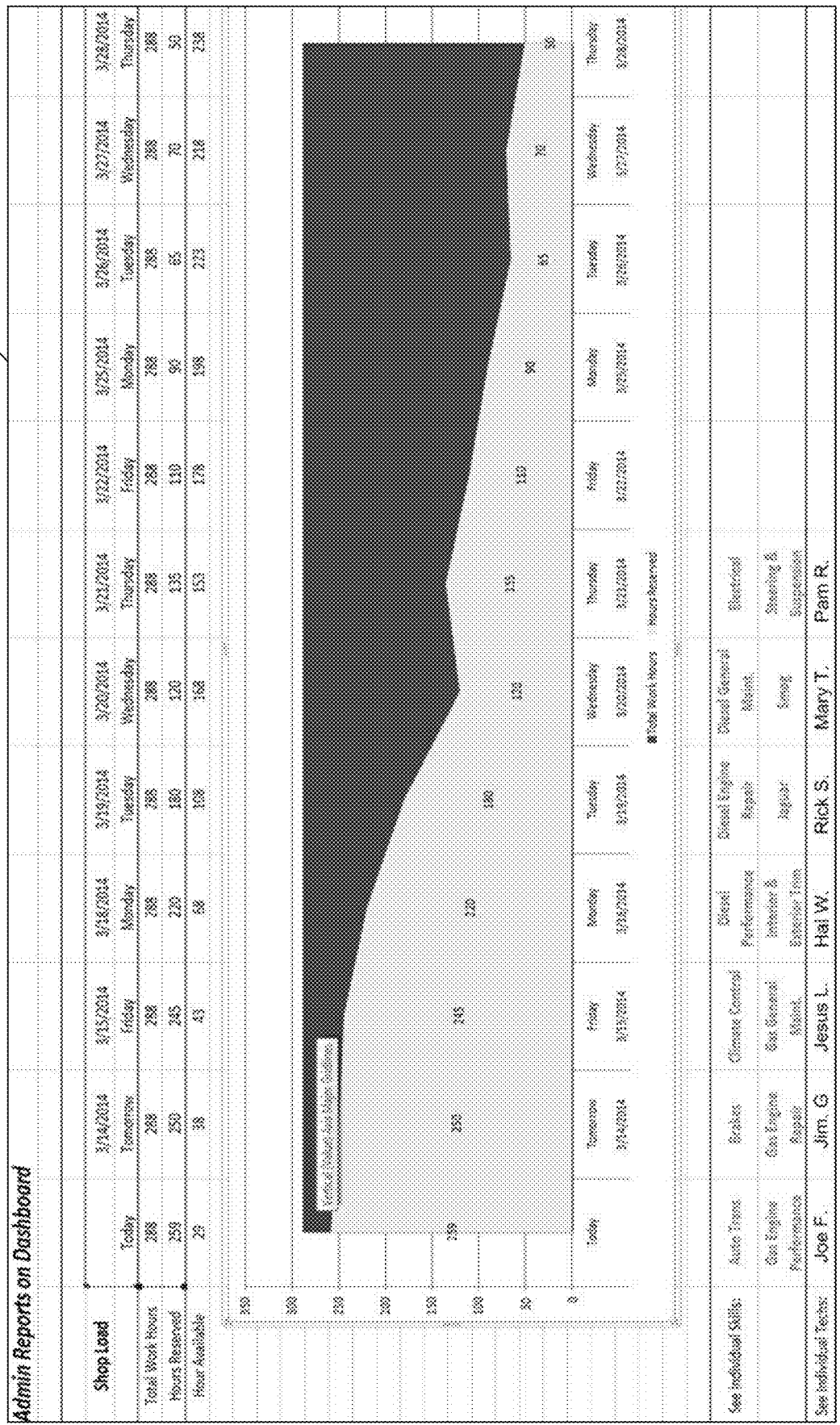
FIG. 24 illustrates an example graphical user interface directed to displaying a facility schedule report based on technician schedules, as described herein in accordance with various embodiments.

FIG. 24 illustrates an example GUI 2400 directed to displaying a facility schedule report based on technician schedules. The loading service 102 may generate the example GUI 2400 based on the work order information stored in the work order information database 128 and/or the scheduling information stored in the scheduling information database 130. As shown in the example GUI 2400, the loading service 102 may access the information to determine a number of total work hours for technician scheduled to work and a number of those hours that are currently reserved for scheduled work for a specified period of time (e.g., individual dates). Accordingly, the number of total work hours minus the number of hours currently reserved for scheduled work may produce a number of hours available to have worked scheduled. This information can be represented via a graph, as shown in the example GUI 2400. Moreover, the loading service 102 may sort the numbers according to one of (i) technician skill and/or type of work or service or (ii) individual technicians.

Figure 25:
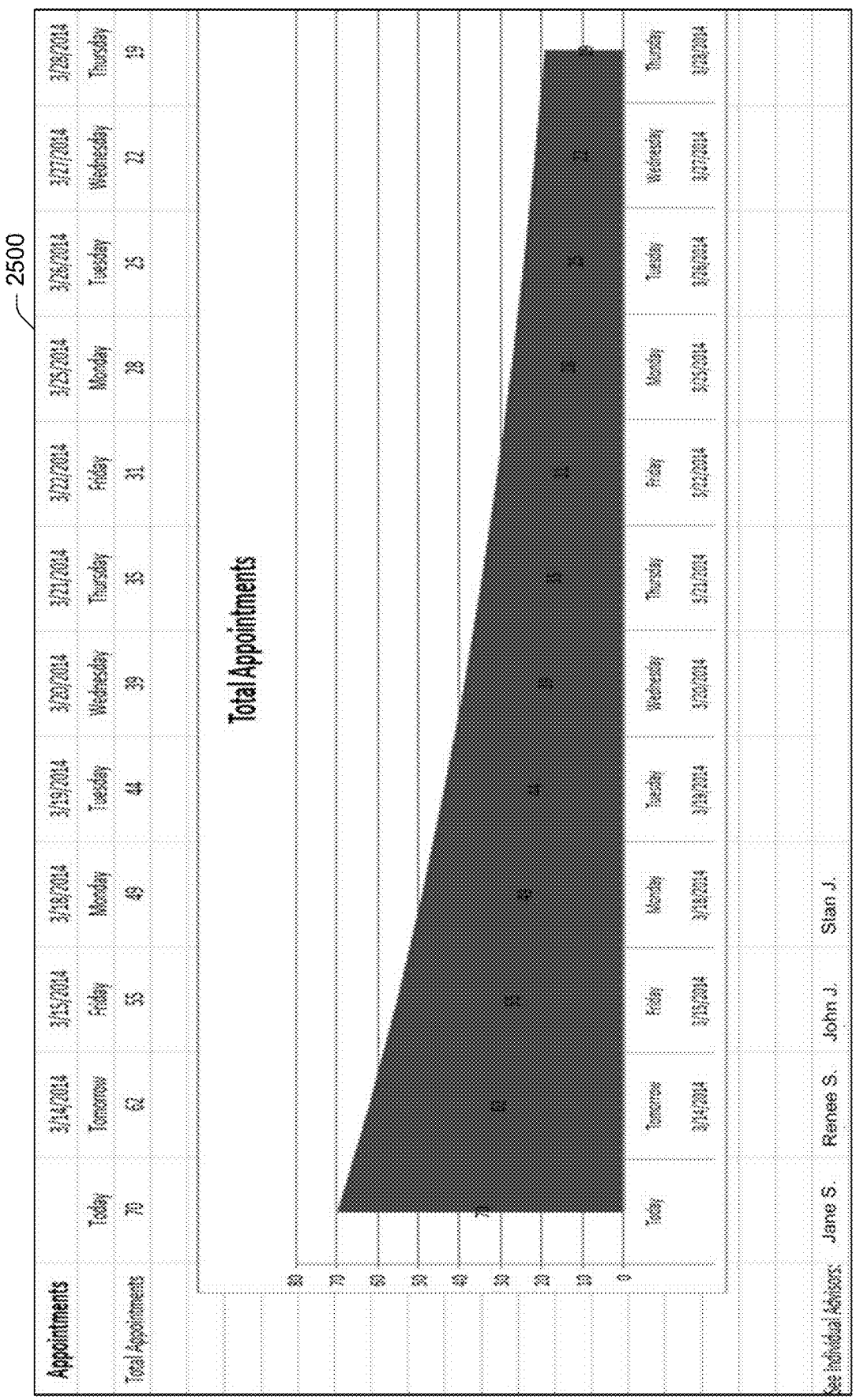
FIG. 25 illustrates an example graphical user interface directed to displaying a facility schedule report based on a number of scheduled appointments, as described herein in accordance with various embodiments.

FIG. 25 illustrates an example GUI 2500 directed to displaying a facility schedule report based on a number of scheduled appointments. The loading service 102 may generate the example GUI 2500 based on the work order information stored in the work order information database 128 and/or the scheduling information stored in the scheduling information database 130. As shown in the example GUI 2500, the loading service 102 may access the information to determine a total number of scheduled appointments for a specified period of time (e.g., individual dates). Moreover, the loading service 102 may sort the numbers according to individual advisors.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system of one or more servers configured to help an entity balance scheduling of appointments for automobile service jobs amongst a plurality of automobile service technicians working at least one automobile service facility that has a plurality of work stations configured to service automobiles, the system comprising:
   one or more processors;
   a database storing facility schedule information comprised of a plurality of automobile service technician schedules associated with the plurality of work stations;
   memory storing instructions that, when executed by the one or more processors, configure the system to perform operations comprising:
      receiving real-time input from a plurality of work station devices associated with the plurality of work stations, the real-time input indicating a time when an individual automobile service technician is to complete an active automobile service job the individual automobile service technician is currently working on;
      updating the facility schedule information stored in the database using the real-time input to ensure that the facility schedule information captures an accurate view of a job load of the at least one automobile service facility;
      receiving, from a scheduler device associated with a scheduler that is responsible for creating a work order on behalf of the entity, an instruction to schedule an appointment for a new automobile service job to be performed on an automobile of a customer, wherein the new automobile service job includes:
         a type of automobile service job to be performed; and
         an indication of whether the customer for which the new automobile service job is being performed comprises (i) a waiting customer physically located at or proximate to the at least one automobile service facility or (ii) a non-waiting customer that has dropped off the automobile at the at least one automobile service facility and subsequently left the at least one automobile service facility;
      matching, for the new automobile service job, the type of automobile service job to be performed with a predefined time period typically required to complete the type of automobile service job, wherein the at least one automobile service facility is configured to perform a plurality of different types of automobile service jobs;
      accessing the facility schedule information to determine available time slots that can accommodate the predefined time period typically required to complete the type of automobile service job included in the new automobile service job;

applying a policy to balance a distribution of automobile service jobs across the plurality of work stations, wherein application of the policy identifies a recommended time slot from the available time slots based at least in part on the indication of whether the customer for which the new automobile service job is being performed comprises (i) the waiting customer physically located at or proximate to the at least one automobile service facility or (ii) the non-waiting customer that has dropped off the automobile at the at least one automobile service facility and subsequently left the at least one automobile service facility;

automatically assigning the appointment for the new automobile service job to the recommended time slot;

generating a graphical user interface that:
displays the plurality of automobile service technician schedules, an individual automobile service technician schedule comprising already scheduled automobile service jobs which have reserved time slots that are visually distinguished based on types of automobile service jobs;
visually distinguishes the available time slots that can accommodate the predefined time period typically required to complete the type of automobile service job included in the new automobile service job from the reserved time slots in individual ones of the plurality of automobile service technician schedules; and
provides a graphical indication of the recommended time slot to which the appointment for the new automobile service job has been automatically assigned;

causing the graphical user interface to be displayed via the scheduler device to the scheduler that is responsible for creating the work order, on behalf of the entity, for the appointment for the new automobile service job, wherein the graphical user interface provides visibility, for a period of time, into the distribution of automobile service jobs across the plurality of work stations;

receiving, from the scheduler device based on input from the scheduler, confirmation to assign the appointment for the new automobile service job to the recommended time slot; and adding the appointment for the new automobile service job to the facility schedule information based on the confirmation.

2. The system of claim 1, wherein the determining the available time slots that can accommodate the predefined time period typically required to complete the type of automobile service job included in the new automobile service job further comprises:
identifying one or more automobile service technicians from the plurality of automobile service technicians based on technician skill indicating that the one or more automobile service technicians are trained or qualified to perform the type of automobile service job on the automobile of the customer; and
locating the available time slots within the automobile service technician schedules of the one or more automobile service technicians identified.

3. The system of claim 1, wherein the operations further comprise:
accessing at least one job label associated with the new automobile service job; and
identifying the recommended time slot based at least in part on the at least one job label.

4. The system of claim 3, wherein the at least one job label indicates that the new automobile service job is to be assigned to an automobile service technician that previously worked on the automobile of the customer.

5. The system of claim 3, wherein the at least one job label indicates that the new automobile service job is to be assigned to an automobile service technician that has a threshold level of skill.

6. The system of claim 3, wherein the at least one job label indicates that the automobile to be serviced is on premises and that the new automobile service job can be scheduled in any available time slot.

7. The system of claim 3, wherein the at least one job label indicates that the automobile to be serviced is off premises and that the new automobile service job has to be scheduled within a particular period of time.

8. The system of claim 7, wherein the particular period of time comprises a specific day comprising specific work hours.

9. The system of claim 1, wherein the available time slots comprise at least a first available time slot associated with a first automobile service technician working at a first automobile service facility and a second available time slot associated with a second automobile service technician working at a second automobile service facility.

10. The system of claim 9, wherein the operations further comprise receiving input indicative of a customer agreement to have the appointment for the new automobile service job scheduled via the first available time slot associated with the first automobile service technician working at the first automobile service facility or the second available time slot associated with the second automobile service technician working at the second automobile service facility.

11. The system of claim 1, wherein the operations further comprise communicating the available time slots to a customer device.

12. A method, implemented by one or more servers, for helping an entity balance scheduling of appointments for automobile service jobs amongst a plurality of automobile service technicians working at least one automobile service facility that has a plurality of work stations configured to service automobiles, the method comprising:
storing facility schedule information comprised of a plurality of automobile service technician schedules associated with the plurality of work stations;
receiving real-time input from a plurality of work station devices associated with the plurality of work stations, the real-time input indicating a time when an individual automobile service technician is to complete an active automobile service job the individual automobile service technician is currently working on;
updating the facility schedule information stored in the database using the real-time input to ensure that the facility schedule information captures an accurate view of a job load of the at least one automobile service facility;
receiving, from a scheduler device associated with a scheduler that is responsible for creating a work order on behalf of the entity, an instruction to schedule an appointment for a new automobile service job to be performed on an automobile of a customer, wherein the new automobile service job includes:

a type of automobile service job to be performed; and an indication of whether the customer for which the new automobile service job is being performed comprises (i) a waiting customer physically located at or proximate to the at least one automobile service facility or (ii) a non-waiting customer that has dropped off the automobile at the at least one automobile service facility and subsequently left the at least one automobile service facility;

matching, for the new automobile service job, the type of automobile service job to be performed with a predefined time period typically required to complete the type of automobile service job, wherein the at least one automobile service facility is configured to perform a plurality of different types of automobile service jobs;

accessing the facility schedule information to determine available time slots that can accommodate the predefined time period typically required to complete the type of automobile service job included in the new automobile service job;

applying a policy to balance a distribution of automobile service jobs across the plurality of work stations, wherein application of the policy identifies a recommended time slot from the available time slots based at least in part on the indication of whether the customer for which the new automobile service job is being performed comprises (i) the waiting customer physically located at or proximate to the at least one automobile service facility or (ii) the non-waiting customer that has dropped off the automobile at the at least one automobile service facility and subsequently left the at least one automobile service facility;

automatically assigning the appointment for the new automobile service job to the recommended time slot;

generating a graphical user interface that:
  displays the plurality of automobile service technician schedules, an individual automobile service technician schedule comprising already scheduled automobile service jobs which have reserved time slots that are visually distinguished based on types of automobile service jobs;
  visually distinguishes the available time slots that can accommodate the predefined time period typically required to complete the type of automobile service job included in the new automobile service job from the reserved time slots in individual ones of the plurality of automobile service technician schedules; and
  provides a graphical indication of the recommended time slot to which the appointment for the new automobile service job has been automatically assigned;

causing the graphical user interface to be displayed via the scheduler device to the scheduler that is responsible for creating the work order, on behalf of the entity, for the appointment for the new automobile service job, wherein the graphical user interface provides visibility, for a period of time, into the distribution of automobile service jobs across the plurality of work stations;

receiving, from the scheduler device based on input from the scheduler, confirmation to assign the appointment for the new automobile service job to the recommended time slot; and adding the appointment for the new automobile service job to the facility schedule information based on the confirmation.

13. The method of claim 12, wherein the determining the available time slots that can accommodate the predefined time period typically required to complete the type of automobile service job included in the new automobile service job further comprises:

identifying one or more automobile service technicians from the plurality of automobile service technicians based on technician skill indicating that the one or more automobile service technicians are trained or qualified to perform the type of automobile service job on the automobile of the customer; and locating the available time slots within the automobile service technician schedules of the one or more automobile service technicians identified.

14. The method of claim 12, further comprising:

accessing at least one job label associated with the new automobile service job; and identifying the recommended time slot based at least in part on the at least one job label.

15. The method of claim 14, wherein the at least one job label indicates that the new automobile service job is to be assigned to an automobile service technician that previously worked on the automobile of the customer.

16. The method of claim 14, wherein the at least one job label indicates that the new automobile service job is to be assigned to an automobile service technician that has a threshold level of skill.

17. One or more non-transitory computer-readable media storing instructions that, when executed by one or more servers configured to help an entity balance scheduling of appointments for automobile service jobs amongst a plurality of automobile service technicians working at least one automobile service facility that has a plurality of work stations configured to service automobiles, cause the one or more servers to perform operations comprising:

storing facility schedule information comprised of a plurality of automobile service technician schedules associated with the plurality of work stations;

receiving real-time input from a plurality of work station devices associated with the plurality of work stations, the real-time input indicating a time when an individual automobile service technician is to complete an active automobile service job the individual automobile service technician is currently working on;

updating the facility schedule information stored in the database using the real-time input to ensure that the facility schedule information captures an accurate view of a job load of the at least one automobile service facility;

receiving, from a scheduler device associated with a scheduler that is responsible for creating a work order on behalf of the entity, an instruction to schedule an appointment for a new automobile service job to be performed on an automobile of a customer, wherein the new automobile service job includes:

a type of automobile service job to be performed; and an indication of whether the customer for which the new automobile service job is being performed comprises (i) a waiting customer physically located at or proximate to the at least one automobile service facility or (ii) a non-waiting customer that has dropped off the automobile at the at least one automobile service facility and subsequently left the at least one automobile service facility;

matching, for the new automobile service job, the type of automobile service job to be performed with a predefined time period typically required to complete the type of automobile service job, wherein the at least one automobile service facility is configured to perform a plurality of different types of automobile service jobs;

accessing the facility schedule information to determine available time slots that can accommodate the predefined time period typically required to complete the type of automobile service job included in the new automobile service job;

applying a policy to balance a distribution of automobile service jobs across the plurality of work stations, wherein application of the policy identifies a recommended time slot from the available time slots based at least in part on the indication of whether the customer for which the new automobile service job is being performed comprises (i) the waiting customer physically located at or proximate to the at least one automobile service facility or (ii) the non-waiting customer that has dropped off the automobile at the at least one automobile service facility and subsequently left the at least one automobile service facility;

automatically assigning the appointment for the new automobile service job to the recommended time slot;

generating a graphical user interface that:
displays the plurality of automobile service technician schedules, an individual automobile service technician schedule comprising already scheduled automobile service jobs which have reserved time slots that are visually distinguished based on types of automobile service jobs;

visually distinguishes the available time slots that can accommodate the predefined time period typically required to complete the type of automobile service job included in the new automobile service job from the reserved time slots in individual ones of the plurality of automobile service technician schedules; and provides a graphical indication of the recommended time slot to which the appointment for the new automobile service job has been automatically assigned;

causing the graphical user interface to be displayed via the scheduler device to the scheduler that is responsible for creating the work order, on behalf of the entity, for the appointment for the new automobile service job, wherein the graphical user interface provides visibility, for a period of time, into the distribution of automobile service jobs across the plurality of work stations;

receiving, from the scheduler device based on input from the scheduler, confirmation to assign the appointment for the new automobile service job to the recommended time slot; and adding the appointment for the new automobile service job to the facility schedule information based on the confirmation.

18. The one or more non-transitory computer-readable media of claim 17, wherein the operations further comprise:
accessing at least one job label associated with the new automobile service job; and
identifying the recommended time slot based at least in part on the at least one job label.

19. The one or more non-transitory computer-readable media of claim 18, wherein the at least one job label indicates that the new automobile service job is to be assigned to an automobile service technician that previously worked on the automobile of the customer.

20. The one or more non-transitory computer-readable media of claim 18, wherein the at least one job label indicates that the new automobile service job is to be assigned to an automobile service technician that has a threshold level of skill.

* * * * *